United States Patent [19]

Wadhwani et al.

[11] 4,302,750
[45] Nov. 24, 1981

[54] DISTRIBUTION AUTOMATION SYSTEM

[75] Inventors: Romesh T. Wadhwani; Joseph F. Russial, both of Pittsburgh, Pa.

[73] Assignee: Compuguard Corporation, Pittsburgh, Pa.

[21] Appl. No.: 63,568

[22] Filed: Aug. 3, 1979

[51] Int. Cl.³ ............................................ H04Q 11/00
[52] U.S. Cl. ........................... 340/870.02; 340/310 A
[58] Field of Search .................. 340/150, 151, 310 R, 340/310 A, 147 T; 364/493

[56] References Cited
U.S. PATENT DOCUMENTS

| | | | |
|---|---|---|---|
| 3,737,858 | 6/1973 | Turner et al. | 340/151 |
| 3,900,842 | 8/1975 | Calabro et al. | 340/310 A |
| 4,012,734 | 3/1977 | Jagoda et al. | 340/151 |
| 4,059,747 | 11/1977 | Brody | 364/483 |
| 4,161,720 | 7/1979 | Bogacki | 340/150 |

Primary Examiner—Donald J. Yusko
Attorney, Agent, or Firm—Fay & Sharpe

[57] ABSTRACT

A data communications system for conveying load control commands, power usage data, and other data on electric power lines. A remote module for reading the power usage meters and controlling loads is disposed at each power usage location. A group of remote modules convey their power usage data to an associated communications terminal to be accumulated, organized and stored. The group also receives load control commands from the communications terminal to cause them to initiate specific load control functions. There are a plurality of communications terminals disposed at various intervals along the primary distribution feeders. A central control unit collects the usage data from the remote modules, generates load control commands, and the like. Communications between the control unit and a destination communications terminal are relayed by the intermediate communications terminals. If an intermediate communications terminal should fail to relay communications properly, the central control unit and the other communications terminals isolate and by-pass the malfunctioning unit. If a communications terminal should fail to communicate properly with its associated group of remote modules, another communications terminal can be programmed to assume its function.

43 Claims, 10 Drawing Figures

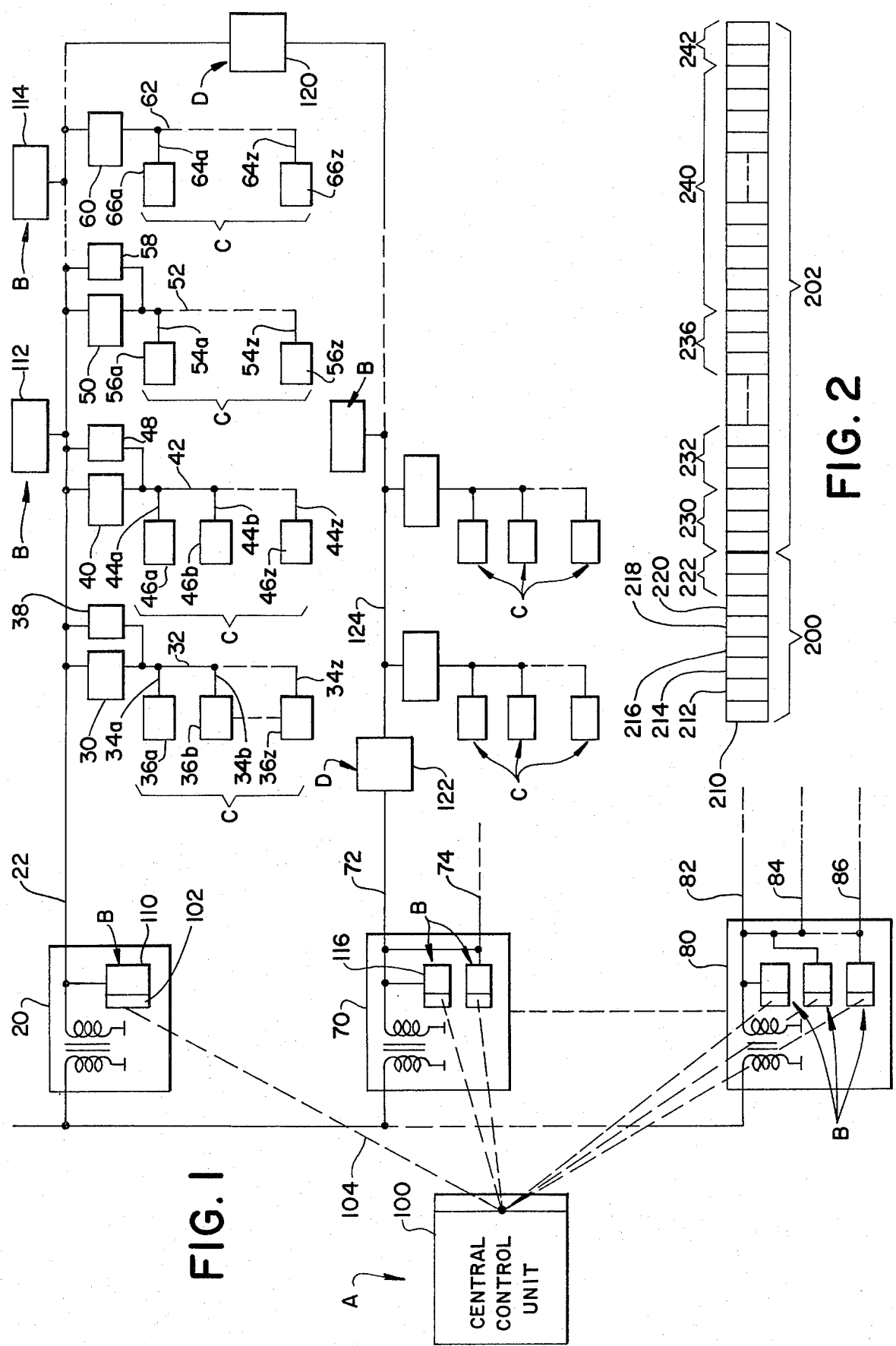

DISTRIBUTION AUTOMATION SYSTEM

BACKGROUND OF THE INVENTION

This application pertains to the art of telecommunications and more particularly to automated power distribution systems. The invention is particularly applicable to electric power distribution systems and will be described with particular reference thereto. It will be appreciated, however, that the invention has broader applications and may be used in distribution systems of many different types including utilities such as natural gas, water and the like.

Generally, an electric power distribution system comprises a plurality of substations which receive high voltage electric power in the range of 135–550 kilovolts. Each substation typically services approximately 6,000–10,000 customers and functions to drop the high voltage thus received to approximately 23 kilovolts or so and then supply this lower voltage to a plurality of primary distribution feeders. Connected to each of the primary distribution feeders are a plurality of distribution transformers which act to drop the 23 kilovolts to 220 volts or to some other common use voltage. Each distribution transformer, in turn, supplies this lower voltage by means of secondary distribution lines to a plurality of customer service lines which supply electrical power to homes, businesses, and other electrical service customers. In the past, it has been found desirable to place electronic devices at each electric service customer location for electronically reading or monitoring the electrical usage meter or for controlling the usage of electric power. Such electronic devices may be operably connected with the utility headquarters in a number of ways including telephone lines, radio communications, and the electric power lines themselves. Telephone communication is relatively high in cost because the tariff structure set by the telephone company would bill each meter reading or control function as a telephone call. Radio communications tend to have interference from buildings and other signals, be high in cost, and have problems with FCC licensing requirements. A low cost alternative is to utilize the power lines themselves. However, the unlike telephone and radio communication systems, power lines are not designed for high speed data communications.

Others have previously suggested using power lines to form at least a portion of a data communications link in an automated power distribution system. Generally, such systems would comprise a large computer at the electric power headquarters for receiving all the meter reading information, generating electric power bills, controlling various loads, and the like. The central computer is connected by a high speed data communications link with a so-called satellite computer disposed at each of the various substations. Each satellite computer is, in turn, in operative communication with remote modules located at the individual customer service locations associated with the particular substation involved. The satellite computers function to collect meter reading data from the individual remote modules and to supply load control commands thereto. In response to such load control commands, the remote modules can perform numerous work functions such as disconnecting the power supply from a hot water heater, air conditioner, or the like. These commands may also cause the remote modules to return meter reading data to the associated satellite computer. The meter reading data may take numerous forms including, for example, the number of units of power used, current cumulative meter reading, power usages by time of day, and the like. It has been further suggested in the prior art to supply relay units at each distribution transformer. These relay units function to relay commands, meter reading data, and the like between each satellite computer and the associated remote modules.

One problem with the above described prior art systems resides in the high cost per customer for implementation. The remote modules in these prior systems have required sophisticated electronics. Indeed, the remote modules often included micro or mini computers with a memory for the storage of data and processing circuitry for handling load control operations, meter readings, and the like between periods of communication with the satellite computer. This has resulted in a high cost per remote module and, hence, a relatively high cost per consumer. The use of relay units at each distribution transformer has further increased the cost per customer. Still another problem has been in the fact that a failure or malfunction of a relay unit undesirably isolates the associated remote modules from the satellite computers. This results in removal of some customer service locations from the data communications system.

The present invention contemplates new and improved apparatus which overcome all of the above problems and others. The invention provides an automatic distribution system which is economical and highly reliable in practical application.

BRIEF DESCRIPTION OF THE INVENTION

In accordance with the present invention, there is provided a communications terminal comprising a communication interface means for receiving and transmitting communications, an identifying means for identifying the remote usage meter associated with a received usage communication, a storing means for storing usage data, a command responding means for retrieving stored usage data in response to a usage retrieval command, and a communication forming means for forming the retrieved usage data into a usage data communication for transmission by the communication interface means.

In accordance with another aspect of the invention, there is provided a data communication system for transmitting data communications on electric distribution lines comprising a central control unit, a plurality of communications terminals which are operatively connected with said electric power distribution lines for transmitting and receiving communications on the electric power distribution lines; and a plurality of remote modules which are operatively connected with the electric power distribution lines for transmitting and receiving communications to and from the communications terminals. The central control unit comprises communication forming means for forming communications from the addresses and commands, communications terminal addressing means for addressing a destination communications terminal and intermediate communications terminals along a route between the central control unit and the destination communications terminal, command generating means for generating commands, interface means for transmitting and receiving communications with a first communications terminal, timing means, and rerouting means for altering the intermediate communications terminals addressed along the route between the central control unit and said destination communications terminal. In this manner, the central unit reroutes a communication through different intermediate communications terminals when an acknowledgment is not timely received from the distination communications terminal.

Each of the communications terminal means comprises communication interface means for receiving and transmitting communications, communications terminal address determining means for determining if a received communication is addressed to the receiving communications terminal, communication destination determining means for determining if the communication is directed to the receiving communications terminal, i.e., if the receiving communications terminal is the destination communications terminal, address altering means for addressing communications not directed to the receiving communications terminal to another communications terminal, command responding means for responding to commands directed to the receiving communications terminal, acknowledgment means for acknowledging receipt of commands addressed to the receiving communications terminal, and communication forming means for forming at least readdressed and acknowledgment communications for transmission by the communication interface means.

The principal purpose of the present invention is the provision of a new automated system for the distribution of electrical energy, water, gas and the like which facilitates monitoring and control of the distribution process.

One advantage of the invention is that it reduces the cost per customer by using a communications terminal which performs many of the functions performed by the remote module relay units and satellite computers of prior art systems.

Another advantage of the invention is that it includes a fail-safe system for malfunctioning communications terminals. In the event a communications terminal fails or otherwise malfunctions, another communications terminal can automatically assume its function.

A further advantage of the present invention is that the communications terminal eliminates the need for the satellite computer. In addition, the communications terminal collects and stores usage meter readings for a plurality of customers.

Still other advantages of the subject invention will become apparent to those skilled in the art upon a reading and understanding of the following detailed description.

BRIEF DESCRIPTION OF THE DRAWINGS

The invention may take physical form in certain parts and the arrangement of such parts, the preferred embodiment of which will be discussed in detail in the specification and the illustrative drawings which form a part hereof and wherein:

FIG. 1 is a block diagram of an automatic distribution system in accordance with the present invention;

FIG. 2 is an illustration of a communication code adapted for use in conjunction with the present invention;

DESCRIPTION OF THE PREFERRED EMBODIMENTS

Figure 3:
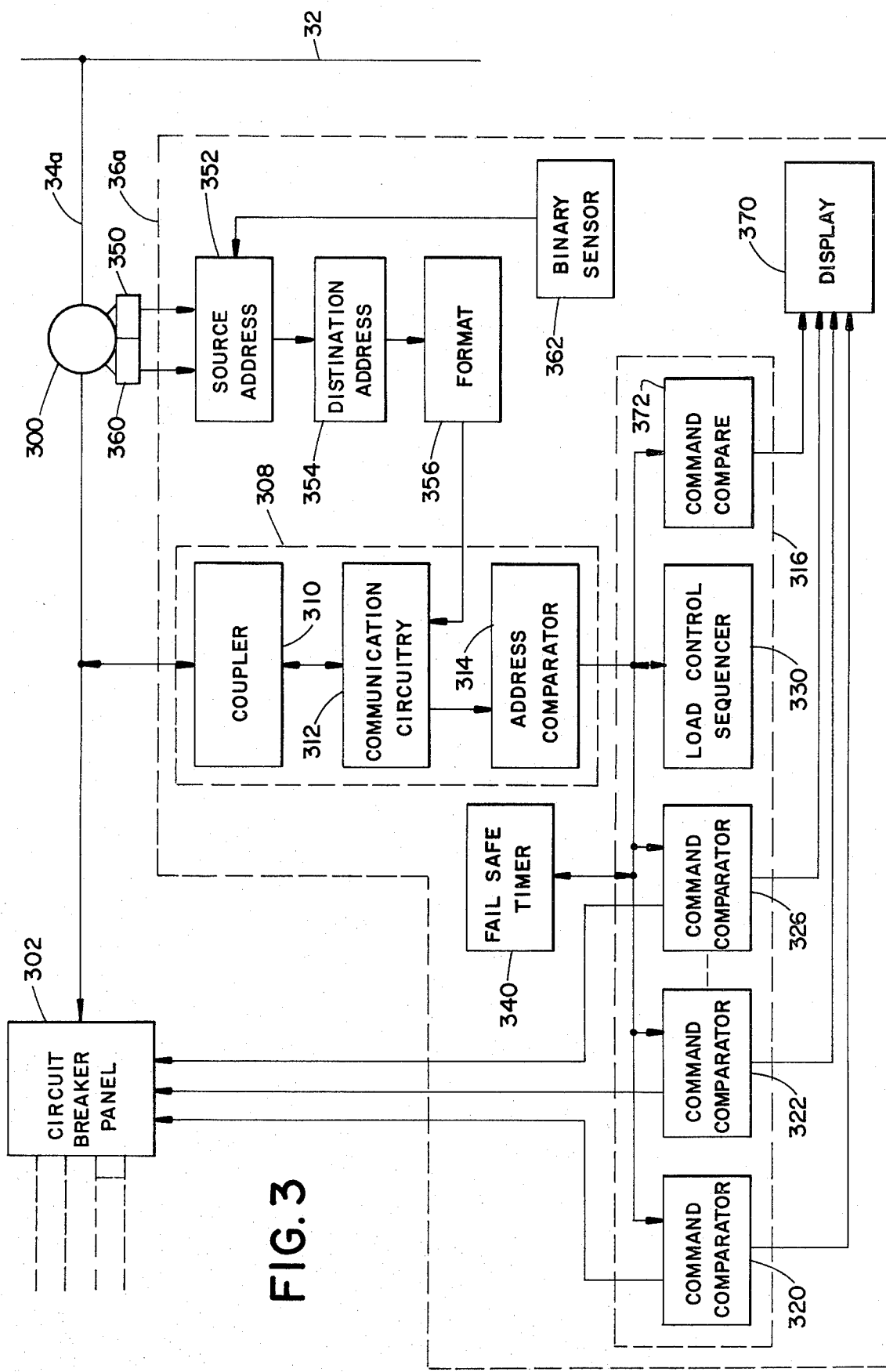
FIG. 3 is a block diagram of one of the remote modules of FIG. 1.

With reference to the drawings, which are for purposes of illustrating a preferred embodiment of the invention only as it is applied to an electrical distribution system and not for purposes of limiting it, the FIGURES show an automatic power distribution system and details of a central control unit, a communications terminal, a remote module distribution bypass circuit, for use therein. Referring to FIG. 1, the system includes a central control unit A which collects usage data from the system, generates communications to system components and performs other functions which will become apparent hereinafter. Also included are a plurality of communications terminals B which relay communications between the central control unit A and other communications terminals B that are more distant from the central control unit. The communications terminals B each communicate with an associated subgroup comprised of a plurality of remote modules C. Further, at least some of the communications terminals are associated with distribution automation modules D for reconfiguring the power distribution system. The communications terminals store usage data from remote modules in the associated subgroups, produce load control communications to the remote modules in the associated subgroup, produce distribution automation communications, and perform numerous other functions which will be described in more detail below.

The electric power distribution system includes a plurality of substations with one each as substation being generally designated 20 in FIG. 1. The substation receives a high voltage electric power, generally in the range of 135–150 kilovolts, and reduces that voltage to, for example, 23 kilovolts. The 23 kilovolt power is conveyed from the substations on a primary distribution feeder such as is generally designated 22 from substation 20. Disposed along the primary distribution feeder 22 are a plurality of distribution transformers 30, 40, 50, and 60. These four transformers are shown by way of illustration only, and it will be appreciated that the number of such distribution transformers may far exceed the number illustrated. These distribution transformers reduce the 23 kilovolt power to a standard voltage such as 220 volts for consumer use. Referring first to distribution transformer 30, the power for consumer use is conveyed therefrom on a secondary distribution line or feeder 32. Between the primary distribution line and secondary distribution line 30 is a distribution transformer bypass means 38 for passing data communications around the transformer. A plurality of customer services lines or feeders denoted 34a through 34z, connect the secondary distribution line 32 with a plurality of remote modules designated 36a through 36z. Similarly, distribution transformer 40 supplies power to a secondary distribution feeder 42 which in turn, supplies power to a plurality of customers along customer service feeders 44a through 44z. Located on customer service feeders 44a through 44z are remote modules 46a through 46z. Similarly, distribution transformers 50 and 60 supply power to consumers on secondary distribution feeders 52 and 62 and a plurality of customer services 54a through 54z and 64a through 64z, respectively. Connected with customer services 54a through 54z and 64a through 64z are remote modules 56a through 56z. Typically, a primary distribution feeder will service 6,000-10,000 consumers and the distribution transformers are located at the rate of about 5-10 per mile along the primary distribution lines. This rate, of course, varies with population density of the area served.

As previously noted, power distribution systems generally comprise a plurality of substations. By way of illustration in FIG. 1, a second substation 70 is shown having a pair of primary distribution feeders 72 and 74 and a third substation 80 is shown having a plurality of primary distribution feeders 82, 84 and 86. Each of these distribution lines has a plurality of distribution transformers and each of the distribution transformers supplies a standard customer usage voltage to a plurality of customers on a secondary distribution line and a plurality of customer service feeders as described above with reference to substation 20. There is also a remote module associated with each of the customer service feeders. Generally, power distribution systems comprise an interconnectable grid of primary distribution feeders. This allows the utility to reconnect secondary distribution feeders to different primary distribution feeders to balance substation loads as customer usage patterns change, to restore power quickly after a power outage, and the like.

The data communication system of the subject invention conveys communications along the electric power distribution system. With continued reference to FIG. 1, the central control unit A includes an interface means 100 which matches an interface means 102 at substation 20. Interface means 100 and 102 convert data into the appropriate form for transmission along a communication link 104 between central control unit A and substation 20. The communications link 104 can take several forms. For example, it may comprise electric power lines, microwave transmission systems, fiberoptic transmission systems, radio transmission systems, or the like. Because a large number of substations communicate with the central control unit, it is desirable that communications link 104 be amenable to high speed data communications.

Associated with interface means 102 is a first communications terminal 110. Communications terminal 110 performs several functions which will be described in more detail in conjunction with FIGS. 4A and 4B. Communications terminal 110 is associated with each of the remote modules 36a-z and 46a-z for commanding one or more of these remote modules to perform load control functions, to store power usage data or the like. Further, communications terminal 110 relays communication between other similar communications terminals spaced further along the primary transmission line 22 and the central control unit A. A second communications terminal 112 is disposed along primary distribution feeder 22 generally about a mile from first communications terminal 110, and is operably associated with subgroups of remote modules disposed along the next mile or so of the feeder. Second communications terminal 112 commands remote modules in this subgroup to perform load control functions and stores power usage data from them. Second communications terminal 112 also relays communications between the first communications terminal 110 and a third communications terminal 114. Additional communications terminals are located along the primary distribution line 22 at approximately one mile intervals.

To collect power usage data, the central control unit A, either automatically or by an operator's instructions, generates communications commanding that the accumulated power usage data be conveyed in a communication to the central unit. A first such communication may be directed to communications terminal 114. The first communication is addressed to communications terminal 110 which receives it and determines whether it is the destination communications terminal. Finding that the communication is directed to another communications terminal, communications terminal 110 readdresses the communication to communications terminal 112 and transmits it on primary distribution feeder 22. Second communications terminal 112 similarly receives the communication, checks its destination and again retransmits it on primary distribution feeder. The third communications terminal 114 receives the communication and determines that it is the communications terminal to which the communication is directed. The third communications terminal responds to the command by forming one or more communications containing the stored usage data. The usage communications are directed to the central control unit A. This communication is transmitted from communications terminal 114 to communications terminal 112 to communications terminal 110 to central unit 110. A similar procedure obtains the data from the remaining communications terminals.

If one of the communications terminals along the route malfunctions or is unnecessary, the system can skip that communications terminal. The central control can cause the first communications terminal 110 to transmit communications to and receive communications from the third communications terminal 114. The first or third communications terminals can also be commanded to store usage data from and supply load control commands to the subgroup of remote modules previously associated with the second communications terminal 112.

The communications terminal 114 and a communications terminal 116 associated with primary distribution feeder 72 can be commanded to command distribution automation modules 120 and 122 generally simultaneously. Automatic distribution modules 120 can connect a segment 124 of feeder 72 to feeder 22 and automatic distribution module 122 can disconnect segment 118 from feeder 72. In this manner, the power distribution system is reconfigured to add segment 124 to substation 20.

The central control unit A may transmit other commands to the communications terminals. These commands include commanding the communications terminal to cause its associated remote modules to perform specified load control functions, reprogramming a communications terminal, commanding a communications terminal to report various internally determined data, and other functions to be explained below. Upon receiving a command which requires no response, such as a load control command, the destination communications terminal transmits an acknowledgment communication to the central control by way of the intermediate communications terminals.

FIG. 2 is illustrative of the communications format of the communications transmitted between the central control unit A and the communications terminals B. Each communication comprises a header section 200 and a tail section 202. In the preferred embodiment, the header section is comprised of eight bytes. The first byte 210 is a synchronization (SYNC) byte which indicates whether the communication is travelling down link, i.e., away from the central control unit or up link, i.e., toward the central control unit. The second byte is a level byte which provides two indications. The first indication is the next communications terminal to receive the signal and the second indication is the destination communications terminal to which the communication is directed. The third byte 214 is a route identification byte. This byte indicates a route between the central control unit and the destination communications terminal. This byte is of particular importance in branched power distribution systems, that is, systems in which the primary distribution feeder 22 branches. For example, after a second communications terminal 112, primary distribution feeder 22 might branch into two primary distribution lines, each of which with a plurality of communications terminals therealong. The fourth byte 216 indicates the number of bytes in the tail. This is significant for recognizing the end of the communication.

The fifth byte 218 is an operation code byte which indicates the nature of the communication. The code indicates whether the communication is a command and if a command, the type of command, whether the communication is conveying power usage data, or the like. The sixth byte 220, is a group code byte. Frequently, e.g., in load control situations and others, it is desirable to instruct numerous communications terminals with the same load control code command simultaneously. To this end, each communications terminal in addition to being assigned individual addresses, is also assigned a group code. This group code is then used to convey a command to all the communications terminals within the pre-assigned group. The seventh and eighth bytes are used for an error checking code. These bytes use a cyclical redundancy check (CRC). With such a check, the first six bytes of the header 200 are used as coefficients of a predetermined polynomial to produce the two bytes of the CRC code. A device which receives the communication can determine if any of the six bytes were altered in transmission by calculating a CRC code from the first six bytes received with the same polynomial and by comparing the calculated CRC code with the transmitted CRC code of the seventh and eighth bytes.

The tail section 202 does not contain a fixed number of bytes but rather, varies with the information communicated and the communications terminal to which the communication is addressed. The first three bytes 230 of the tail indicate the first communications terminal which is to receive and generally retransmit the message. The second three bytes 232 indicate the second communications terminal which is to receive the communication. In this manner, the three-byte address of each of the communications terminals which is to handle the communication are arranged in order along the tail. The last three-byte communications terminal address 236 indicates the destination communications terminal to which a communication is directed. The next group of bytes 240 contain the data or the command. The final two bytes 242 are a second error check. Again, the two bytes 242 contain a CRC code similar to bytes 222 of the header. However, polynomial coefficients used to produce the two byte code are the preceding bytes of the tail. Communications between the communications terminals and the remote modules may use the same format or a simplified format.

FIG. 3 is illustrative of a remote module which includes a load control portion and a meter reading portion. For purposes of illustration, remote module 36a will be described in detail, it being appreciated that the other remote modules are similar thereto. As previously noted, customer service feeder at line 34a is connected to the secondary distribution line 32 for purposes of bringing power from the street to a customer service location, i.e., a home, business, or the like. Power is conveyed through an electrical meter 300 which measures the amount of power utilized. From the meter, power is conveyed through a circuit breaker panel, fuse box, or other system 302 for distributing power within the customer service location. Remote module 36a is connected with service 34a by a remote module interface means 308 for receiving and transmitting communications on the power distribution lines. The interface means comprises a coupler 310 for separating the communication from the electric power, a communications circuit 312 for converting the communication between a power line format and a digital format, and an address comparator means 314 for recognizing the address of the remote module. In the preferred embodiment, the communications are conveyed on the power lines as a phase modulated high frequency voltage signal applied or superimposed over the standard 60 hertz electrical signal. Coupler 310 separates the high frequency communication signal from the 60 hertz electrical signal. It may, by way of example, take the form of a capacitor. The phase modulated communication from coupler 310 is converted to a digital communication by communication circuitry 312. The digital communication is received by address comparator means 314 for comparing the address portion of the communication with the address of remote module 36a. If the address does not match the address of remote module 36a, the entire signal is discarded. If the address does match the address of remote module 36a, the communication is passed to a command responding means 316 for recognizing each command and invoking the appropriate response to the command.

The command responding means 316 includes a plurality of command comparators of which comparators 320, 322 and 326 are shown by way of illustration. The exact number of comparators varies with the number of load control and other functions to be performed by the remote control module. Each of the command comparators compares the command portion of the communication with a predetermined command signal. For example, comparator 320 may compare the incoming command signal with the command signal for blocking or allowing power to the hot water heater. The command comparators may operate the circuit breakers within the circuit breaker panel or other switches within the panel to connect or disconnect the flow of power from service 34a to a specific one of the loads. Alternately, the load control switch may be located almost anywhere along the electric lines in the service location such as at the hot water heater or other load. Optionally, the command responding means may include a load control sequence means 330. The load control sequencer in response to a specific load control command, can serially or cyclically generate one or more of the load control commands which are recognized by command comparators 320, 322, and 326. In this manner, the load sequencer can block various loads from receiving power in a predetermined order for a predetermined period of time in response to a single command signal. The remote module 36a receives a first signal to disconnect the load and a subsequent second signal to reconnect the load. However, it is undesirable to leave the consumer disconnected from a specific load for a long period of time. This might occur in a system malfunction. Accordingly, the remote module further includes a fail-safe timer means 340. Each incoming load disconnect command causes timer means 340 to start timing a predetermined period. If a command to reconnect the load is not received within the period of fail-safe timer 340, the timer generates a reset or reconnect signal to comparators 320, 322 and 326.

Each of the automatic distribution modules D is essentially the same as the load control portion of the remote module. The commands to the automatic distribution module, however, are limited to connect and disconnect commands. The fail-safe timer is unnecessary. The command responding means 316 controls a high power switch connected to a primary distribution feeder.

Also illustrated in FIG. 3 is a first embodiment for performing the meter reading function of remote module 36a. In this embodiment, meter 300 is a pulse initiator-type meter. The meter includes a pulser 350 which produces an output pulse after a predetermined quantity of electrical power has been consumed. There are numerous ways from which this pulse may be caused. For example, most electric meters have at least one rotating disc or gear. The disc may have an aperture disposed therein and a light source and photoelectric detector disposed on opposite sides of the disc. As the disc rotates, the aperture periodically enables the light source to illuminate the photoelectric detector and produce an output pulse. Alternately, the disc may carry a magnet which passes a stationary reed switch as the disc rotates. This output pulse forms the data to be transmitted to communications terminal 110 for storage. A source address means 352 adds the address of remote module 36a to this data for identifying the remote module from which the communication is originating. A communications terminal address means 354 adds the address of the destination communications terminal 110 to the communication. A remote module communication forming means 356 collects the addresses and data and puts them in the appropriate format to form a communication. The communication is conveyed to the remote module communication interface means 308 to be transmitted on the power distribution lines. The communication circuitry 312 converts the communication from digital to a high frequency phase modulated signal and coupler 310 superimposes the high frequency signal on the customer service 34a. The remote module may also perform gas and water meter reading functions and collect data of other types. Optionally, the automation distribution modules D may perform analogous monitoring functions.

The remote modules also form communications indicating if someone has tampered with meter 300. Meter 300 includes a means which senses meter tampering. This means may be an easily ruptured conductive strip, a switch that is tripped by removal of the meter from its socket, or the like. A tamper detector means 360 generates a tamper signal when the tamper sensing means is activated. The remote modules may also include a binary sensor means 362 for sensing whether a condition occurs. The binary sensor may sense the voltage or current on line 34a exceeding an upper threshold, may verify that an appliance disconnected by a load control signal is drawing no power, may sense a gas meter alarm, or the like.

The remote module may also perform various customer notification functions and may also include a display 370 for displaying information to the consumer. Display 370 may be connected with command comparators 320, 322 and 326 to produce an indicia that one or more of these loads are disconnected. Further, command responding means 316 may include a command comparator 372 for recognizing commands to display accompanying data on the display. This data may be power usage summaries, histories, or other indications of the customers' power usage. This data may further include informational messages such as payment reminders, energy saving tips, weather forecasts, or the like.

Figure 4A:
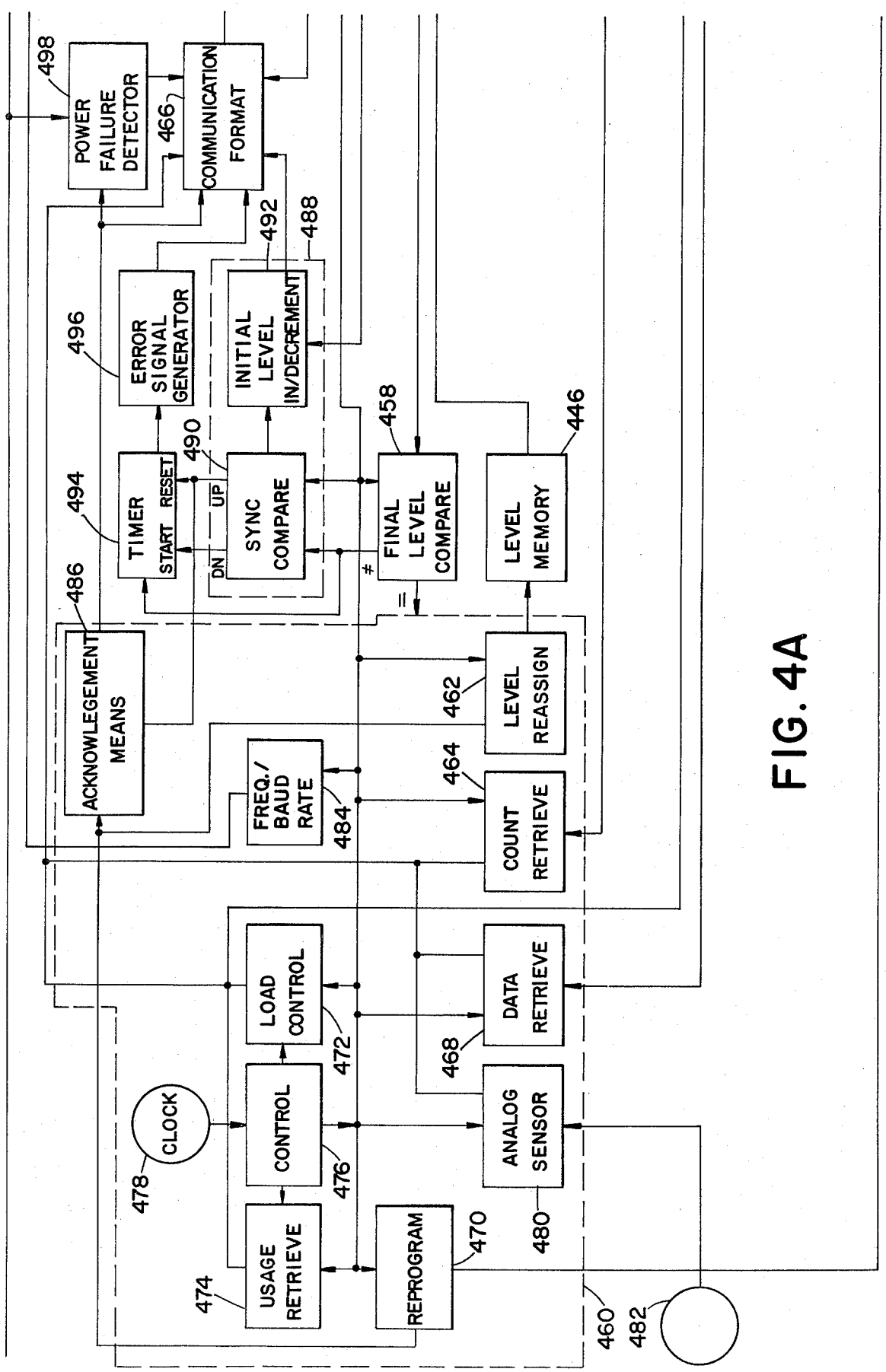
FIGS. 4A and 4B are a block diagram of one of the communications terminals of FIG. 1.
Figure 4B:
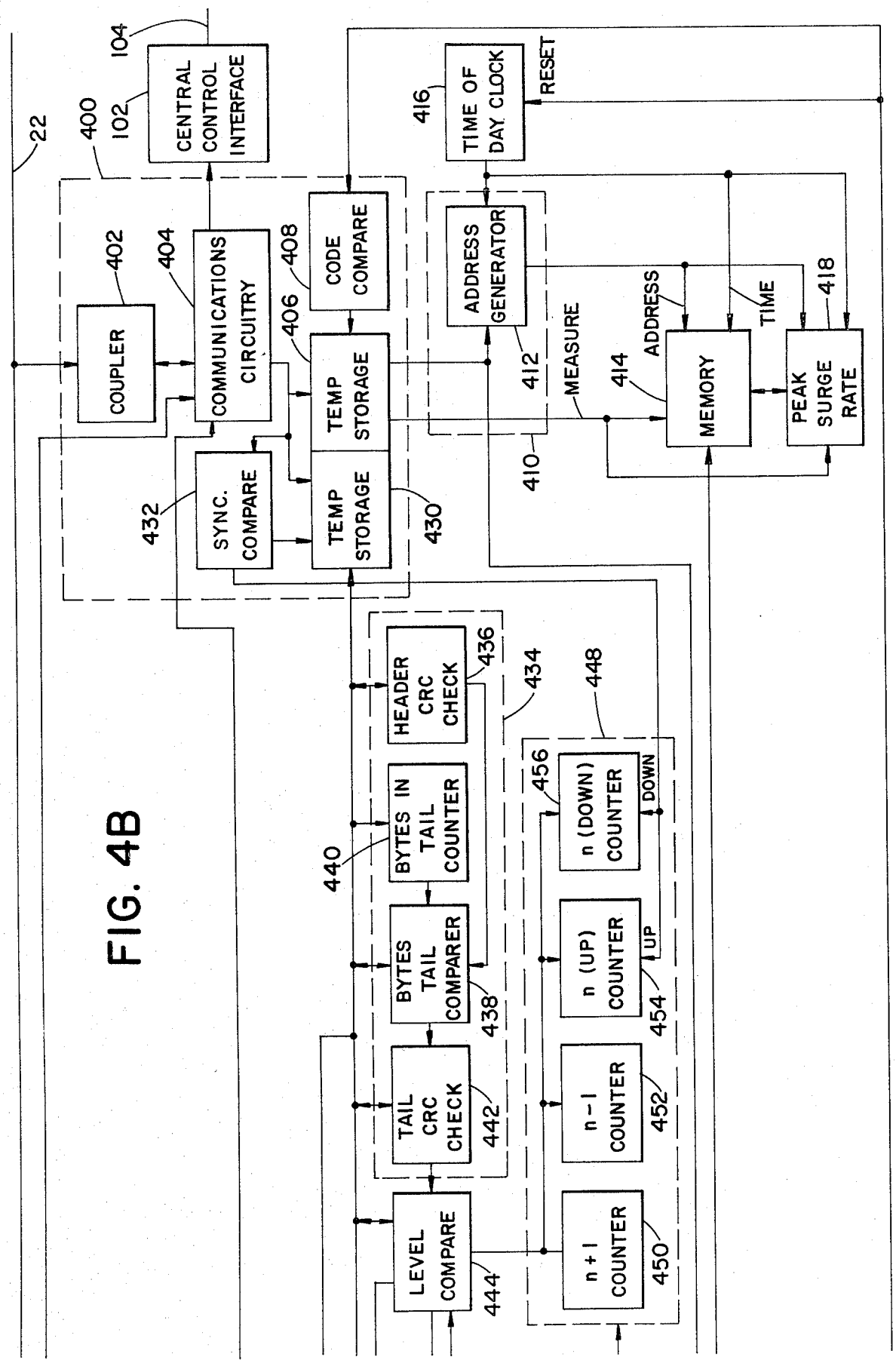

FIGS. 4A and 4B illustrate one of communications terminals B such as those designated by numerals 110, 112, 114 in FIG. 1 which receive and store the usage data from a plurality of remote modules. The communications terminal has a communications interface means 400 for receiving and transmitting communications on primary distribution feeder 22. The communications interface means comprises a coupler 402 for separating the high frequency, phase modulated communication from the 60 hertz electric power on primary distribution feeder 22. Communication circuitry 404 converts the communication between phase modulated communications and digitial communications. Digital communications are conveyed to a temporary storage means 406 and a means for determining whether the communications is addressed to the communications terminal. This latter means includes a code comparator 408 for comparing the address code on remote module originating communications with the communications terminal address. This comparison may be based on a digital comparison, a frequency of the phase modulated communication comparison, or the like. If the code comparator finds that the communication matches its address, then it enables temporary storage 406 to receive and hold the communication. The communication in temporary storage 406 is received by an identification means 410 for identifying the remote module associated with a usage communication stored in temporary storage 406. The identification means may take several forms. In the preferred embodiment, the communication includes both the address of the associated remote module and the power usage data. The identification means includes an address generator 412 which reads the remote module address part of the communication in temporary storage 406, and generates the appropriate storing means address.

A storing means 414 for storing the usage data associated with each remote module receives a storing means address from address generator 412 and the individual power usage data from the temporary storage means 406. The storage means may be a random access memory or the like. The size of the memory is determined by the number of remote modules associated with the communications terminal, the frequency which the memory conveys its accumulated data to the central control unit, and the like. Also connected with address generator 412 is a time of day power usage cost zone indicating means 416 for indicating the present cost zone. To encourage consumers to use less power at peak demand hours and more power at low demand hours, some utilities have different cost zones during the day. Address generator 412 incorporates the cost zone into the storing means address. Thus, the storing means stores cumulative power usage data for each customer by cost zone.

In addition to storing the cumulative amount of power used by each customer in each time zone, the means 414 also stores an indication of the rate of power usage. To discourage sudden peak surges of power usage and to encourage customers to use a relatively constant amount of power, it is desirable to monitor power surges or peaks by the customer. In the present embodiment, each time storing means 414 is addressed, a means 418 for determining surges in the rate of power usage looks to the information stored in memory 414 to determine the time since the preceding power usage communication from the same remote module was received to determine the rate of power usage. Further, surge determining means 418 retrieves an indication of the previous peak surge stored in conjunction with that particular consumer and time zone. Surge determining means 418 then compares the present power usage rate with the stored peak surge rate to determine the greater. It then returns the greater of the two to the memory 414. In this manner, memory 414 maintains a total of the amount of power used in each time zone by each consumer and the highest level of demand in each time zone by each customer. Alternately, storing means 414 may store gas usage data, water usage data, or other data collected by the remote module.

With continued reference to FIGS. 4A and 4B and with supplemental reference to FIG. 2, communications terminals receive and respond to commands from the central computer and relay messages passing between the central computer and other communications terminals. These functions are in addition to storing the meter readings. When a communication passes along primary distribution feeder 22, coupler 402 removes the communication from the power distribution lines. Communication circuit 404 transforms the communication into digital format and a temporary storage means 430 stores the communication. Temporary storage means 430 may be the same or a part of temporary storage means 406 discussed above. Part of the means for determining whether a communication is addressed to the communications terminal is a SYNC comparator 432 which compares the SYNC byte 210 of the header 200 (FIG. 2) with the up link and down link transmission codes to determine whether or not the received communication is a transmission between communications terminals. If it is, it enables temporary storage 430 to store the communication; and if it is not, the communication is discarded. In this manner, abberations and noise on the electrical power signal may be separated from communications. This may also separate communications between the communications terminals from communications between other communications terminals and remote modules.

Each communication stored in temporary storage means 430 is checked by error checking means 434 for errors introduced during transmission. The error checking means includes a header error checking means 436 for determining whether the first six bytes 210, 212, 214, 216, 218, 220 (FIG. 2) of the header are in compliance with the error code of the seventh and eighth bytes 222 of the header.

Specifically, means 436 reads the first through sixth bytes of the header and uses them as a coefficient of a polynomial to calculate a CRC error code. Then, means 436 compares the calculated error code with the CRC error code transmitted in the seventh and eighth bytes of the header. If the calculated error code and the transmitted error code lack sufficient conformity, the error check means causes the temporary storage means 430 to discard the communication. When the calculated error code and the transmitted error code do not match, it is sometimes possible to correct the error in the first six bytes. For this purpose, error check means 434 may further contain the appropriate processing means for implementing a conventional sequence of mathematical calculations to determine the error in the first six bytes and correct them. Such a process is well known in the art for cyclical redundancy codes and need not be explained in detail herein. If there is sufficient conformity, header error check means 436 enables a comparator 438 for comparing the fourth byte of the header with the actual number of bytes in the tail.

Counter 440 counts the number of bytes in the tail of the received communication. Still referring to FIGS. 2 and 4, and upon being enabled by header error check means 436, comparator 438 reads the fourth byte 216 of the header and compares its indication of the number of bytes in the tail with the number of bytes counted by counter 440. If comparator 438 fails to find agreement on the number of bytes in the tail, temporary storage means 430 discards the stored communication. If there is agreement, comparator 438 then enables a tail error check means 442. Like error check means 436, tail error check means 422 reads each of the bytes in the tail and uses them as the coefficients of the polynomial to calculate a CRC error code. Tail error check means 442 then compares the calculated error code with the error code read from the last two bytes of the tail. If the two fail to match, then temporary storage means 430 is caused to discard the stored signal. If the calculated and read error check codes match, the tail error check means then enables a first level comparator 444. As described in reference to header error check means 436, tail error check means 442 may similarly include processing circuitry for recreating or correcting errors in the bytes in the tail.

As discussed herein along with reference to FIG. 2, the second bytes 212 of the header indicates the level of the communications terminal to which the communication is addressed and the level of the communications terminal to which the message is directed. The level indicates the number of transmissions or communications terminals from the central control unit. Thus, communications terminal 110 is level 1, communications terminal 112 is level 2, communications terminal 114 is level 3, etc. If the communication is addressed to a lower level communications terminal than the communications terminal to which it is directed, the lower level communications terminal receives and simply retransmits the communication. The first level comparator 444 is a part of the means for determining whether a communication is addressed to the receiving communications terminal. It reads the level of the present communications terminal from a level memory 446 and compares it with the level of the communications terminal to which the communication is addressed. If the levels do not match, comparator 444 causes the temporary storage means 430 to discard the signal as not being addressed to this communications terminal. Further, comparator 444 compares the level with the level of the communications terminal directly preceding it and proceeding it. A counter means 448 is connected to the first level comparator 444 to count the number of communications of various levels which are received by the communications terminal.

In the preferred embodiment, counter means includes a counter 450 for counting the number of communications accurately received by the present communications terminal which are directed to the next highest level, a counter 452 for counting the number of communications received which are addressed to the next lower level, a counter 454 for counting the number of up link communications accurately received which are addressed to the communications terminal, and a counter 456 for counting the number of down link communications addressed to the communications terminal. It will be appreciated that by comparing the output of counters 450 and 454 it can be determined whether the present communications terminal was receiving all the up link messages addressed to preceding communications terminal. Similarly, by comparing counters 452 and 456, it can be determined whether the present communications terminal was receiving all the down link communications addressed to the preceding communications terminal. When the present communications terminal is receiving substantially all of the communications addressed to the preceding communications terminal, then the preceding communications terminal is not essential. Accordingly, the speed in which communications travel the route through the communications terminals can be accelerated by skipping nonessential communications terminals. As will be discussed hereinafter in connection with the central control unit A, the addresses within the communication indicated by bytes 230, 232 and 236 of tail 202 can be altered to skip the nonessential communications terminals.

If the first level comparator 444 determines that the communication is addressed to the present communications terminal, it enables a communication destination determining means 458. In the preferred embodiment, the communication destination determining means comprises a comparator for comparing the level to which the communication is addressed and the destination level. If these two levels match, then the present communications terminal is the destination communications terminal. If these two do not match, then the message is directed to a subsequent communications terminal and is to be retransmitted by the present communications terminal. If the present communications terminal is the destination communications terminal, comparator 458 enables a command responding means 460. The command responding means receives the command portion of the communication, compares the command with its repetoire of commands and produces the appropriate response.

The command responding means comprises a means 462 for reassigning the level number to memory 446. When a nonessential communications terminal is removed from a route, the level of each subsequent communications terminal drops by one. A counter retrieving means 464 compares a received command with the command to retrieve the counts in counting means 448. In response to such a command, count retrieving means reads the counters and supplies the data to a communication forming means 466 which forms a communication for conveying the count data to the central control unit. A cumulative power usage retrieving means 468 recognizes commands to retrieve data stored in memory 414. In response to the command, retrieving means 468 serially generates the storing means addresses at which the requested data is stored. As memory 414 is addressed, it conveys the power usage data via means 468 to communications forming means 466.

A reprogramming means 470 resets and reprograms various parts of the system. The reprogramming means may be a memory which is addressed by a command to produce the appropriate response. In response to appropriate commands, reprogramming means 470 may reset cost zone clock 416, reset the code of comparer 408 or reprogram or reset other components of the communications terminal. A load control command responding means 472 responds to load control commands. The load control command responding means conveys the address of each of the remote modules associated with the communications terminal and the load control command to the communication forming means 466 for forming communications for the communications terminals. A usage retrieve means 474 responds to commands to cause remote modules to convey stored power usage data to the communication terminal. Power usage retrieval means is used in conjunction with the remote module which will be described below with reference to FIG. 6. A control means 476 may periodically generate commands in conjunction with a clock means 478. Control means 476 may be programmed, for example, to read usage data stored in remote modules at one hour intervals, command remote modules to disconnect air conditioning loads during a selected period of each day, send usage data from memory 414 at a pre-assigned time, and to perform many other useful functions.

The command responding means 460 further comprises a condition reporting means 480 which reports a condition sensed by a sensor 482 in response to a command. Sensor 482 may sense temperature, primary feeder voltage, current, power factor, the position of switches, or the like. A communications circuitry frequency and data transmission rate means 484 is responsive to frequency commands to reset the frequency on which the communications terminal receives and transmits communications. Means 484 is further responsive to data rate command to the rate of data transmission, or baud rate of the communications terminal. This allows the central control unit to match transmission characteristics to the electrical conditions on the power distribution lines. For example, if the distribution lines are noisy, the rate of data transmission can be reduced to improve the reliability.

Some commands do not require a response communication to be transmitted to the central control unit A. As an indication that these commands have been received, the communications terminal transmits an acknowledgment. The command responding means 460 includes an acknowledgment means 486 which causes communication forming means 466 to delete the command from the communication and insert an acknowledgment. Further, the acknowledgment means changes the SYNC byte from a down link to an up link indication, removes the present communications terminal addresses from the tail, and the like.

If comparator 458 finds that the addressed level does not equal the destination level, the communications terminal retransmits the message. If the message is to be retransmitted, comparator 458 enables an address altering means 488. The address altering means includes a SYNC comparator 490 for determining from the SYNC byte 210 of the header whether the command is travelling up link or down link and a level incrementing means 492 for increasing or decreasing the level to which the communication is addressed. The address altering means 488 conveys the altered address to communications forming means 466.

The communications terminal further checks to make sure that down link communications reach their ultimate destination. To this end, SYNC comparator 490 starts a transmission timing means 494 in response to a determination that the communications is a down link communication. Transmission timing means 494 continues to run until an up link acknowledgment communication from the destination communications terminal is received. In response to an up link determination by SYNC comparer 490, timing means 494 is stopped. The length of the period timed by timing means 494 is selected on the basis of the difference in the addressed level and destination level determined by comparator 458. In this manner, a communication travelling relatively far down link to a destination communications terminal is alotted a relatively long time to send an acknowledgment. If the acknowledgment is not received within the alotted time, transmission timing means 494 actuates an error signal generator 496. The error signal generator 496 causes communication forming means 466 to build an error communication to the central unit indicating the lack of an acknowledgment. It will be appreciated that the central control unit can ascertain the point of a transmission failure by reviewing the communications terminals which do and do not send error signals.

A power failure means 498 detects power failures. Even a short power failure may alter the electronic equipment of the communications terminal. To alert the central control unit A that a communications terminal has been subject to a power failure, power failure means 498 inserts a power failure indication in communications directed to the central control unit. This alerts the central control unit to send command communications to reprogram and reset those components which are altered by a power failure.

Communication forming means 466 receives incoming communications from the communication interface means 400. The command responding means 460, acknowledgment means 486, address altering means 488, and the error signal generator 496 each alter some of the bytes. The communication forming means recalculates the number of bytes in the tail indication for the header, the header and tail error codes, and the like. The reformatted communication is conveyed from the communication forming means 466 to communication interface means 400 for transmission on the electric power distribution lines. The communications terminal may be implemented with a suitably programmed microcomputer in combination with coupler 402 and communication circuit 404.

The first communications terminal on the primary distribution lines e.g., communications terminal 110 on line 22 of FIG. 1, must also communicate with the central control unit A. For this purpose, an additional interface means 102 (FIGS. 1 and 4) is connected with the communications circuitry 404 (FIGS. 4A and 4B). The interface 102 adapts each communication coming from or going to the central control unit A to the appropriate format for communication along communication link 104. This interface may, for example, comprise a radio transmitter and receiver, microwave transmitter and receiver, a telephone hook-up, or the like.

Figure 5:
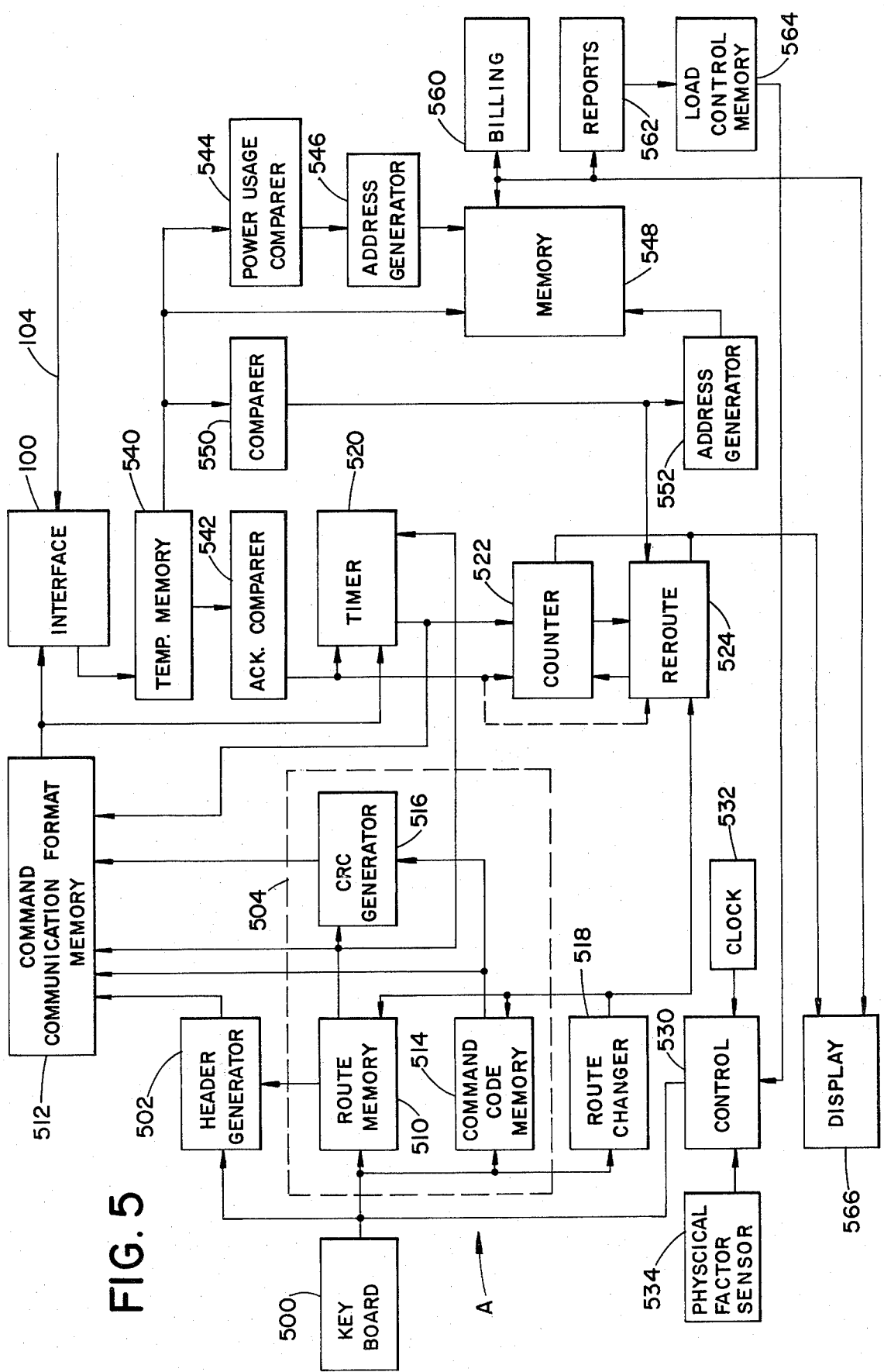
FIG. 5 is a block diagram of the central control unit of FIG. 1.

FIG. 5 is illustrative of the preferred embodiment for central control unit A. Among the functions performed by the central control unit is collection of usage data for billing and reporting purposes, generation of load control commands, and maintenance of the system in proper working order. To generate a command communication to one of the communications terminals B, an operator at a keyboard 500 indicates the destination of the command and the command itself. Keyboard 500 is connected with a header generator 502 and a tail generator 504. The header generator generates the eight bytes which form the header portion 200 (FIG. 2) of a communication. The tail generator generates the series of addresses 230, 232, and 236, the command or other data bytes 240, and the correction code 242 (FIG. 2) The tail generator includes a communications terminal addressing means 510 for generating the address of the destination communications terminal and the intermediate communications terminals along the route. The communications terminal addressing means may comprise a route memory which contains a table of all the routes from the control unit to the individual communications terminals. Once addressed with the address of one of the communications terminals, route memory 510 produces a serial list of the addresses of each of the communications terminals between the central control unit and the destination communications terminal. From this information, header generator 502 determines the final destination level indication of header section byte 212. The series of addresses from route memory 510 is conveyed to a communications forming means 512 in which a communication is structured. The series of addresses from route memory 510 are loaded into bytes 230, 232 and 236 of the tail section of the communication. The tail generator 504 further includes a command generating means 514 for generating commands. The command generating means may be a command memory which is addressed by keyboard to produce the appropriate command code for bytes 240 of the tail section of the communication. The tail generator further includes a cyclical redundancy code generator 516 which uses the bytes produced by the route memory 510 and command memory 514 as coefficients for a polynomial to produce the 2 byte error code 242.

When the automatic distribution modules D reconfigure the power distribution lines, route memory 510 must be adjusted to provide the new routes to the communications terminals along the segment of a primary distribution line that has been reconnected. A route changing means 518 receives the connect and disconnect commands directed to the automatic distribution modules. From these command it reprograms route memory 510 with the new routes.

With continued reference to FIG. 5, after a communication is assembled in communications forming means 512, it is transmitted by interface means 102 and communication link 104 to the appropriate communications terminal B (FIG. 1). Upon transmission, a timing means 520 for timing the duration between transmitting the command and receiving acknowledgment or data communications is actuated. The time period for timing means 520 is set by the route memory 510 based on the number of levels between the destination communications terminal and the central control unit. The time period is selected to provide sufficient time for the command signal to be propagated along one of the primary distribution feeders from communications terminal to communications terminal, reach the destination communications terminal, and an acknowledgment to be returned. If timing means 520 is not reset by the receipt of an acknowledgment before the time period has lapsed, it generates a signal indicating that no acknowledgment was received. This signal causes communication forming means 512 to retransmit the command communication. Further, this signal indexes a counter 522. Counter 522 counts the number of attempts that have been expended in trying to reach the destination communications terminal. After a preselected number of such attempts, the control unit initiates an automatic rerouting to isolate the malfunctioning communications terminal. While this rerouting may be accomplished in a number of ways, the preferred embodiment contemplates use of a rerouting means 524 which alters the intermediate communications terminals addressed by route memory 510. Specifically, rerouting means 524 serially deletes intermediate communications terminal addresses one at a time. After each address is deleted, route memory 510 conveys a revised set of intermediate communications terminal addresses to the communications forming means. The command communication, with the address codes revised, is retransmitted by the interface means 100. If no acknowledgment is received in the appropriate period of time by timer 520, the timer causes the command communication to be retransmitted and advances or steps counter 522. If the communication fails to reach the destination communications terminal within the predetermined number of attempts, rerouting means 524 causes reroute memory 510 to delete a different one of the intermediate communications terminal addresses from the communication. This procedure may be repeated so as to remove the intermediate communications terminal addresses serially one at a time until the signal reaches the destination communications terminal and an acknowledgment is received. Further, upon completion of the serial deletion of one of the communications terminal addresses, rerouting means 524 may serially delete two communications terminal addresses, etc. until the communication reaches the destination communications terminal and an acknowledgment is received.

As an alternate arrangement, rerouting means 524 may isolate the malfunctioning communications terminal by causing the central control unit A serially to address each of the communications terminals B along the route to the destination communications terminal and command each of them to return an acknowledgment. In this arrangement, rerouting means 524 causes command memory 514 to generate the appropriate command for an acknowledgment and also causes route memory 510 to generate addresses for communications to each communications terminal between the central control unit and the destination communications terminal. If an acknowledgment is received from the first communications terminal, reroute means 524 causes the route memory to address the communication to the second communications terminal along the route. This process is similarly repeated until the one or more communications terminals which fail to respond are isolated. Route memory 512 is then reprogrammed to skip the malfunctioning communications terminal or communications terminals. Rerouting means 524 may also cause previously malfunctioning communications terminals to be reinserted into the routes. Communications terminals may malfunction due to changes in electric power loads which have subjected the adjacent power distribution lines to extreme voltage, current, or impedance conditions. When these extreme conditions return to normal, the malfunctioning communications terminal may again perform normally. Various other alternative arrangements may be devised for isolating malfunctioning communications terminals with a minimal number of transmissions.

Continuing with reference to FIG. 5, the load control command power usage data retrieving commands or other commands made to the communications terminal on a regular basis may be generated automatically by a control means 530. This control means is connected with a clock means 532 for indicating the time of day, day of the week, month, and so on. Control means 530 may be designed to perform certain load control functions daily between predetermined hours, on weekdays between predetermined hours, and so on. Further, the control means may be designed to cause usage data to be conveyed from the communications terminals to the control unit on various selected periodic bases. In another alternative, physical factor sensor 554 may respond to various physical factors to initiate load control functions. For example, the control means 530 may have preselected air conditioning load control command generating cycles which are initiated automatically when physical factor sensor 534 senses a predetermined temperature level.

Incoming acknowledgments or data are received by interface means 100 (FIGS. 1 and 5) and channeled to a temporary storage means 540. Code recognition means connected to the temporary memory 540 determine the nature of the incoming communication. The code recognition means includes an acknowledgment means 541 which compares the data or code bytes 240 of the communication with the standard acknowledgment code and determines whether the incoming communication is an acknowledgment. If the incoming communication is determined to be an acknowledgement, acknowledgment means 542 generates a signal which resets timer 520 and counter 522. The code recognition means further comprises a means 544 for recognizing incoming usage data. Means 544 allows incoming data to reach an address generator 546 which generates the appropriate addresses for a main memory means 548. Address generator 546 generates the appropriate addresses to memory means 548 to store power usage data, peak surge data, gas or water usage data, and the like. Various other comparators may be used to determine other types of incoming data signals. For example, a comparator 550 recognizes incoming data indicative of the count stored in counters 450, 452, 454 and 456 of the communications terminals. These counts may be conveyed to an address generator 552 for addressing the memory 548 to store the counts therein. Alternately, the counts may be conveyed to reroute means 524 to cause the reroute means to eliminate one or more of the communications terminals along some of the routes to maximize the speed of communication.

Main memory 548 may be connected to a billing means 560 for periodically reading the power usage data for each of the customer service locations and generate appropriate customer bill or statements. A report and statistical analysis means 562 may periodically examine customer usage information and generate statistical analyses thereof. These reports may be conveniently printed out in written format. Alternately, a control memory 564 containing the time periods at which the various control functions are to be initiated may be adjusted automatically. Based on the statistical reports, the cost zones may be automatically altered to fit or accommodate customer usage patterns more precisely. Further, a display means 566 may display various data stored in the memory. Moreover, display 566 may be connected with counter 522 and reroute means 524 to produce a display indicative of communications terminal malfunctions.

If desired, the central control unit A may include an appropriately programmed computer to perform many of the above functions. An IBM 370 or IBS 4300 computer marketed by International Business Machines are examples of computers which could advantageously be employed for this purpose.

Figure 6:
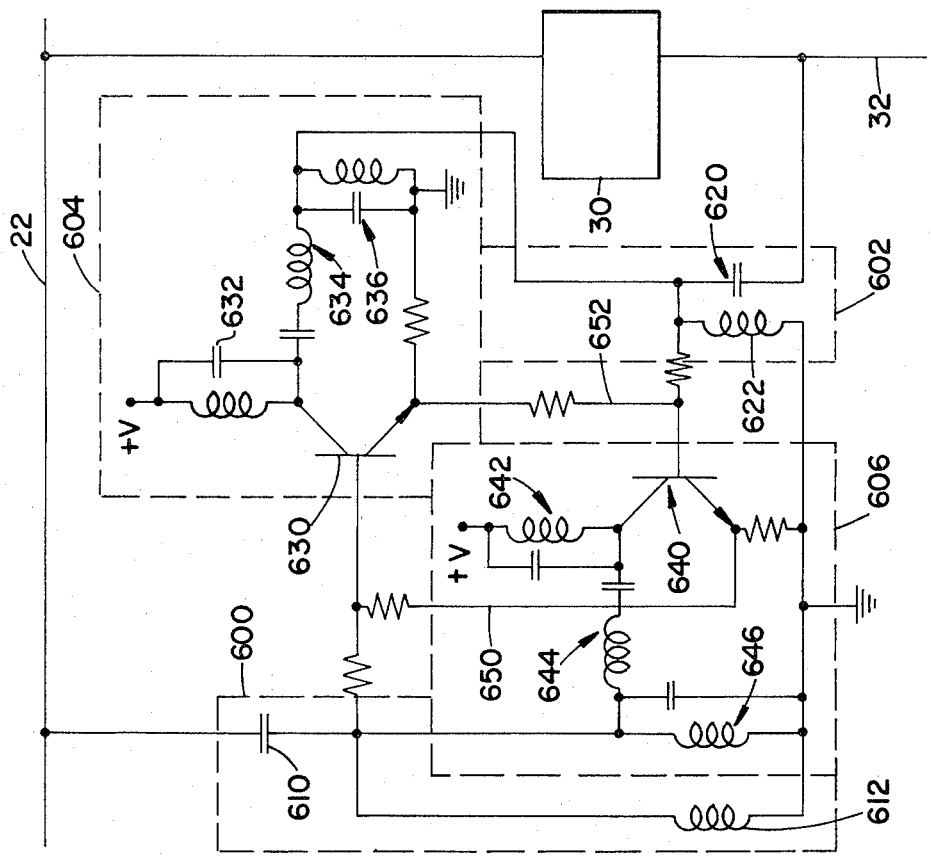
FIG. 6 is a diagram of the bypass circuit.

FIG. 6 illustrates the details of the distribution transformer bypass means. Bypass means 28 is shown by way of example but it will be appreciated that each of the bypass means are substantially the same. The bypass means comprises a first or primary coupling means 600 for passing communications but not electric power to and from the primary distribution line 22 and a second or secondary coupling means 602 for passing communications but not electric power to and from the secondary distribution line 32. Connected in parallel between the primary and secondary couplers are a down link isolation means 604 for conveying communications from primary distribution line 22 to secondary distribution line 32 and an up link isolation means 606 for conveying communications from secondary distribution line 32 to primary distribution line 22. The up link and down link isolation means are interconnected so that each adjust the output of the other to match the impedance of the distribution line on which the bypass means is to transmit the communication.

The first coupling means 600 comprises a capacitor 610 for passing oscillating components and an inductor 612 for grounding the lower frequency components, particularly the sixty hertz electric power signal. The secondary coupler 602 comprises a capacitor 620 for passing oscillating components and an inductor 622 for grounding the sixty hertz components.

Down link isolation means 604 comprises a down link amplifier means comprising a transistor 630 with its base connected to the junction of capacitor 610 and inductor 612 of the first coupling means. Connected to the collector of transistor 630 are filters 632, 634 and 636 for limiting the frequency of the transistor output to data communications frequencies. The collector is connected to the secondary coupling means by filter 634 to form the down link output. The down link isolation means receives communications from the primary distribution feeder via the first coupling means, amplifies the communications, and transmits the communications on the secondary distribution feeder via the secondary coupling means.

Up link isolation means 606 comprises an up link amplifier means comprising a transistor 640 with its base-connected to the junction of capacitor 620 and inductor 622 of the second coupling means. Connected to the collector of transistor 640 are filters 642, 644 and 646 for limiting the frequency of the output to data communications frequencies. The collector is connected to the first coupler means by filter 644 to form the up link output.

The up link and down link isolation transistors each have a feedback loop between its emitter and the base of the other. A first feedback loop 650 connecting the emitter of transistor 640 with the base of transistor 630 provides an impedance matching means for varying the gain of the down link amplifier means generally proportionately with the impedance of the secondary distribution feeder. As the impedance of the secondary distribution feeder increases, the potential on feedback loop 650 increases which, in turn, increases the gain of transistor 630. Similarly, a second feedback loop 652 connecting the emitter of transistor 630 with the base of transistor 640 provides a second impendance matching means for varying the gain of the up link amplifier generally proportionally with the impedance of the primary distribution feeder.

Figure 7A:
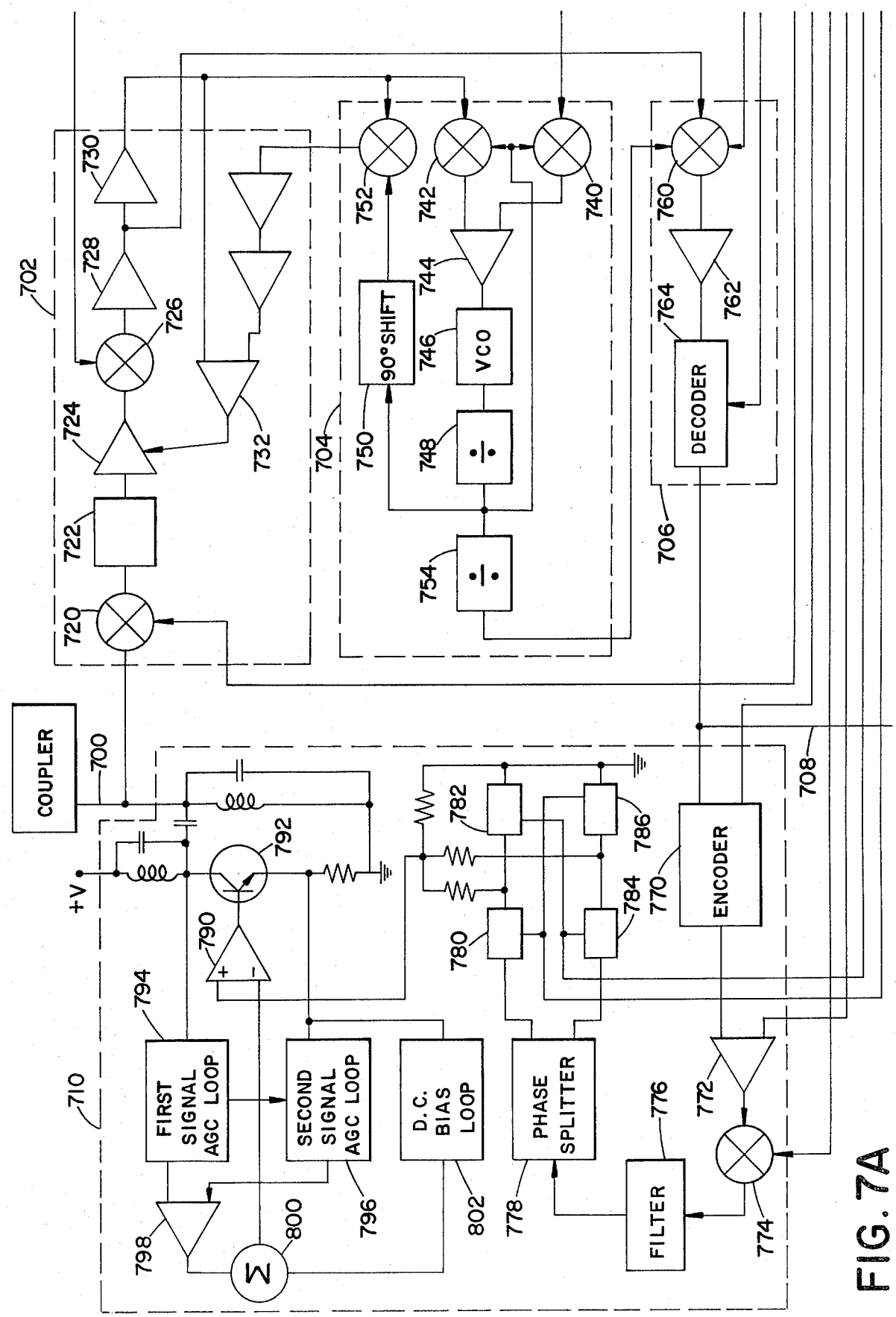
FIGS. 7A and 7B are an expanded diagram of the communications circuitry of FIGS. 3 and 4b.
Figure 7B:
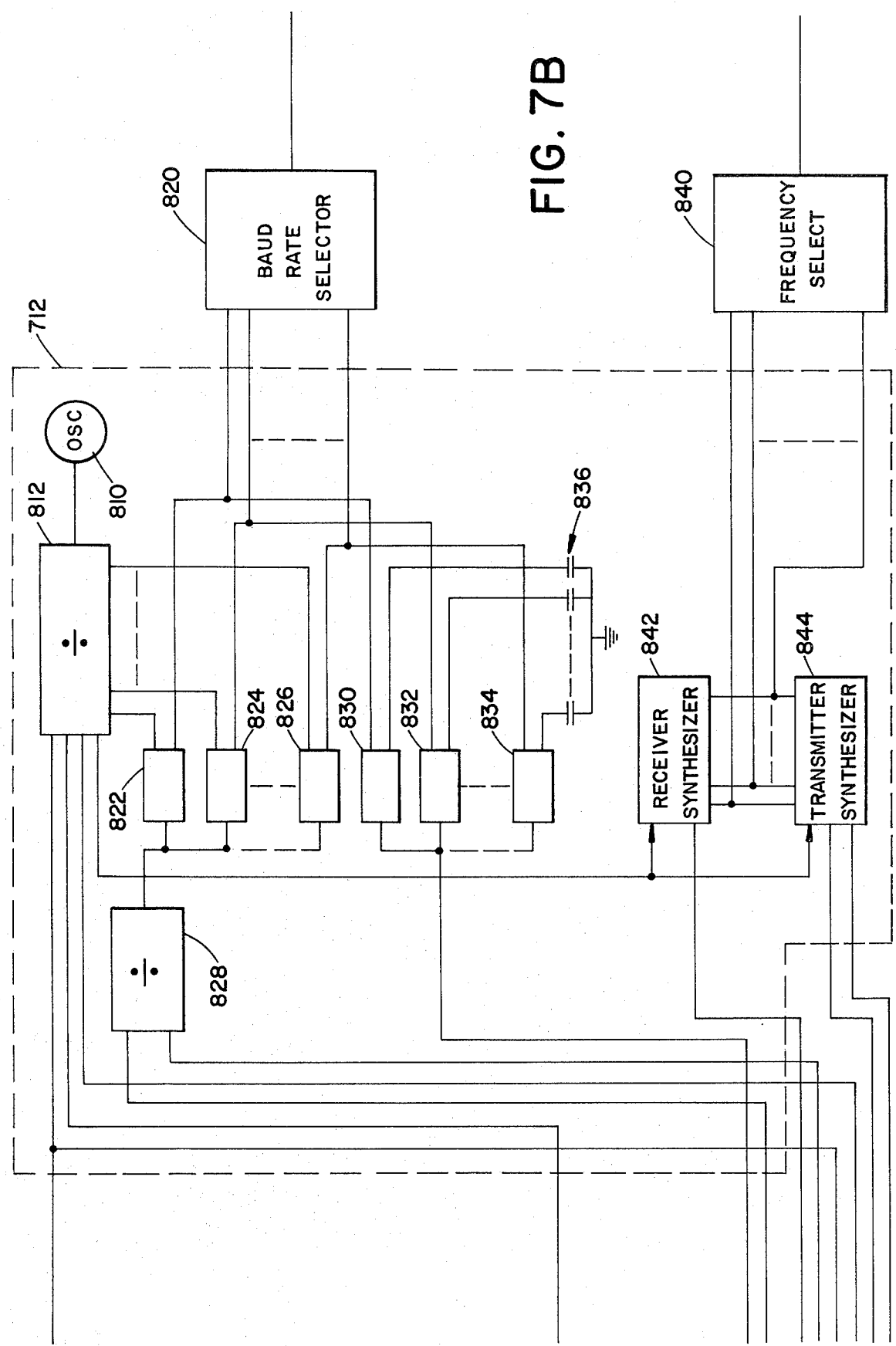

FIGS. 7A and 7B illustrate the communication circuitry denoted 312 in FIG. 3 and denote 404 in FIG. 4B in further detail. The communication circuitry is connected with the coupler by a line 700. Incoming communications on line 700 are conveyed to a double conversion superheterodyne receiver with automatic gain control 702. Receiver 702 is connected with a demodulating means 704 for demodulating the received signal. Receiver 702 and demodulating means 704 are connected with a decoding means 706 which decodes the data to produce NRZ data on line 708 for the data handling section of a remote module or communications terminal. When the communication circuitry is to transmit data, data from the data handling section are received on line 708 and conveyed to a transmitter means 710. Transmitter means 710 encodes the data as a phase modulated signal which is transmitted on line 700. A master oscillator and synthesizer 712 produces the various clock rate signals used in the communication circuitry.

Receiver 702 comprises a first mixer 720 which mixes the incoming signal with a signal from the master oscillator to produce a signal centered about a preselected frequency. A filter 722 filters signals not of the preselected frequency. A gain controlled amplifier 724 increases the amplitude of the signal to a preselected level. The automatic gain control feature ensures the signal will have the preselected level regardless of the amplitude of the received signal. A second mixer 726 reduces the frequency of the signal to a second preselected frequency, in the preferred embodiment 7 kilohertz. The 7 kilohertz phase modulated signal is amplified by a second IF stage amplifier 728. The signal is rectified by an active rectifier 730 to produce a 14 kilohertz reference. An AGC amplifier 732 combines a non-coherent automatic gain control signal from active rectifier 730 with a coherent automatic gain control signal from demodulating means 704 to provide the gain control to gain controlled amplifier 724.

Demodulating means 704 is a phase lock loop-type demodulator. It receives a 14 kilohertz reference from the master oscillator at a first mixer 740. This reference holds the demodulator to the 14 kilohertz center point when no data is being received. The signal from the active rectifier 730 is received by a second mixer 742 of the demodulator. If a signal is present at mixer 742, mixer 740 is disabled. A loop filter 744 removes high frequency components from the 14 kilohertz signal which it receives from first mixer 740 or second mixer 742. A voltage controlled oscillator 746 in conjunction with a divider 748 produces a 14 kilohertz square wave. The square wave is shifted by 90 degrees by a phase shift circuit 750. A third mixer 752 mixes the 90 degree phase shifted signal with the 14 kilohertz reference signal from active rectifier 730. This produces a zero output except when a phase transition occurs. At the phase transition, a pulse is produced. The zero or pulse signal is conveyed to the automatic gain control amplifier 732. Another divider 754 reduces the square wave frequency to 7 kilohertz to produce a reference signal which is in phase with the 7 kilohertz phase modulated signal emerging from the second stage amplifier 728. The signal from divider 754 is conveyed to decoding means 706.

Decoding means 706 has a decoder mixer 760 which mixes the phase modulated 7 kilohertz signal from second stage amplifier 728 of the receiver with the 7 kilohertz reference signal from divider 754 of the demodulator. Mixer 760 produces a zero output except when a phase shift occurs. This phase shift produces a unity output. A Schmidt trigger 762 ensures that the unity output pulses are of a consistent amplitude and duration. A data decoder 764 converts the series of zero and unity amplitude pulses received from the Schmidt trigger into the appropriate format, also known as NRZ data, for the data handling circuitry in the module. The NRZ data is conveyed to the terminal or module on line 708.

With continued reference to FIGS. 7A and 7B, the transmitter means 710 has a data encoder 770 which receives NRZ data from line 708 and produces a series of zero and unity amplitude phase encoded signals. The encoder is also connected to the master oscillator to receive an oscillating signal whose frequency determines the transmission or baud rate of the data to be transmitted. A phase modulator 772 receives the encoded data from encoder 770 and a 7 kilohertz signal from the master oscillator 712. The phase modulator produces a 7 kilohertz signal with phase encoded data. A mixer 774 mixes the 7 kilohertz signal up to a preselected frequency. A filter 776 removes transient signals at other than the preselected frequency. A phase splitter 778 splits the phase modulated signal into two signals 180 degrees out of phase with each other. A series of four analog switches 780, 782, 784 and 786 combine the out of phase signals from phase splitter 778 with each other and with ground. Switches 780 and 786 are controlled by a first oscillating signal from master oscillator 712 and switches 782 and 784 are controlled by a second oscillating signal of the same frequency but 180 degrees out of phase. The output of the switches provides a phase encoded signal having a frequency which is determined by the frequency of the first and second signals which control switches 780, 782, 784 and 786. This phase encoded signal is amplified by an output amplifying stage which varies the amplitude of the amplified signal with the impedance of the primary distribution line.

The output amplifier stage comprises an operational amplifier 790 which controls the base of a transistor 792. In the preferred embodiment, transistor 792 has a constant current (class A) output with an inductive load. A first signal automatic gain control loop 794 is connected to the collector of output transistor 792 to sense the voltage at the collector. This voltage is proportional to the impedance on the primary distribution line. A high impendance, hence, a high voltage at the collector produces a signal which, as will be explained below, is applied to the inverting input of opertional amp 790 to reduce the output current from transistor 792. If the impedance is extremely high, the first signal automatic gain control loop 794 also acts to reduce the voltage at the collector. A second signal automatic gain control loop 796 is connected to the emitter of output transistor 792. The second signal automatic gain control loop is enabled by the first automatic gain control loop 794 if a low voltage is sensed. The second signal automatic gain control loop produces a signal for increasing the output current of transistor 792. The signal form the first and second signal automatic gain control loops are combined by an automatic gain control amplifier 798 and conveyed by a summing node 800 to the inverting input of operational amplifier 790. A DC bias loop 802 is connected with the emitter of output transistor 792 to provide a signal which holds the transistor at the appropriate operating point. The output of DC bias loop 802 is summed with the output of automatic gain control amplifier 798 by summing node 800 for application to the inverting input of operational amplifier 790. Thus, operational amplifier 790 and transistor 792 form an amplifying means for amplifying the phase modulated signal. The first and second AGC load loops 794 and 796 form means for sensing the impedance of the primary distribution feeder and amplifier 798 and summer 800 form means for varying the gain of the amplifier means with variations in the impedance of the primary distribution feeder.

With continued reference to FIGS. 7A and 7B, the master oscillator and synthesizer 712 includes an oscillator 810 and a multiple output binary divider 812. The multiple outputs of the divider 812 produce a plurality of reference signals at the various required frequencies. Divider 812 provides the reference signal for mixers 726 and 774, the 14 kilohertz reference signal from mixer 740, the 7 kilohertz reference signal for phase modulator 772 and a plurality of frequencies corresponding to each of the selectable baud rates.

A data transmission rate selection means 820 selects the baud rate or data transmission in response to commands received by the means 484 of FIG. 4A for responding to frequency and data transmission rate commands. Data transmission rate selection means 820 may be a series of latches which respond to a binary signal to control appropriate analog gates. A plurality of analog gates including gates 822, 824, and 826 are connected with frequency divider 812 to receive a frequency corresponding to each of the selectable data transmission rates. Data transmission rate selection means 820 enables the appropriate one of gates 822, 824, 826, or the like corresponding to the selected data transmission rate to supply data rate signals of that frequency. A divider 828 adjusts the frequency to provide two frequencies, one for the receiver and one for the transmitter. The receiver data rate frequency is connected to decoder 764 and the transmitter data rate frequency signal is connected to encoder 770. As discussed above, the frequency of these data rate signals determine the data rate at which data is transmitted and decoded. Further, the data transmission rate selection means controls a second set of analog gates 830, 832, and 834. These analog gates connect an appropriate one of a group of capacitors 836 with the decoder mixer 760. The size of capacitors 836 are selected to supply a higher capacitance filter at lower baud rates and a lower capacitance filter at higher baud rates to maximize band width.

A frequency selection means 840 is similarly connected to means 484 for responding to frequency and data rate commands. In response to the appropriate frequency command signal, frequency selection means 840 causes a receiver synthesizer 842 and a transmitter synthesizer 844 to produce output signals of a frequency corresponding to the selected transmission frequency. Receiver synthesizer 842 is connected with the first mixer 720 of the receiver 702 to synthesize a signal corresponding to the frequency to be received in such a relationship that after the received signal and the synthesize signal are combined, the combined signal will have a frequency matching the center frequency of filter 722. Transmitter synthesizer 844 produces a pair of oscillating signals 180 degrees out of phase. These 180 degree out of phase signals operate to actuate switches 780, 784 and 786 as discussed above in conjunction with transmitter means 710.

In this manner, the communication circuitry uses a lower power transmitter that automatically and continuously matches the transmitter impedance to the impedance of the primary distribution line. This system further includes means for selecting among a plurality of data transmission or baud rates and a plurality of carrier frequencies so that the carrier frequency and baud rate may be selected and changed as required by changes in power line conditions. Thus, when conditions in the power lines are highly condusive to data transmission, a high baud rate may be used to convey data quickly. Whereas, when data line conditions are less condusive, a slower baud rate may be used. Further, multiple communications may take place simultaneously on the same power line without interference by transmitting on different carrier frequencies. Thus, one of the primary distribution lines, there may be a first communication path of communications terminals operating at a first frequency and a second communications path of communications terminals operating at a second frequency.

Figure 8:
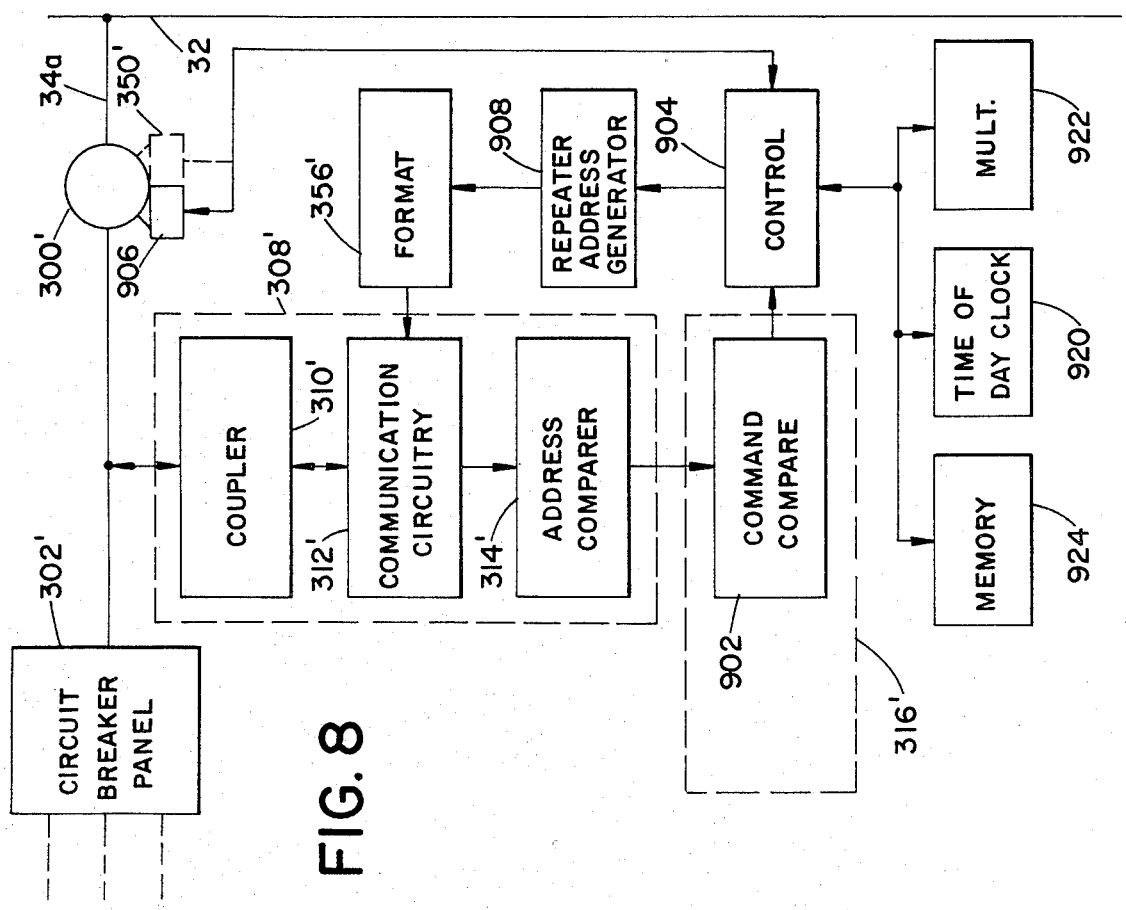
FIG. 8 is an alternate embodiment of a remote module in accordance with the present invention.

FIG. 8 illustrates an alternative embodiment of the meter reading funcioning portions of the remote module 36a shown in FIG. 3. In FIG. 8, and for ease of applicating the embodiment, like components are identified by reference numerals followed by a prime (') suffix and new components are identified by new numerals. The embodiment of FIG. 8 works in a poled mode as opposed to the interrupt mode utilized in FIG. 3. In the poled mode, the meter 300' or remote module B stores the meter readings or other usage measurements until the measurement information is requested by the communications terminal. Remote modules monitor communications transmitted on service lines 34a with remote module communications interface means 308'.

Communications addressed to the remote module are received by a meter reading command comparer 902 of command responding means 316'. If such a meter reading command is recognized, a control circuit 904 is actuated. The nature of the control 904 may vary with the nature of the meter 300'. The meter 300' may be a shaft encoded meter or pulse initiator type meter. In a shaft encoder type, the meter mechanically stores the power usage data as a meter reading. An encoder 906 is provided in conjunction with the meter for converting the mechanically stored information into electrical pulses. Electrical pulses are indicative of a meter reading. Control means 904 causes the encoder 906 to produce the current meter reading and forwards the meter reading to a communications terminal addressing means 908 which adds to the meter reading the address of the communications terminal associated with the particular communications terminal module. Remote module communications forming means 356' replaces the address and data into the appropriate format and conveys the communication to the remote module communication interface means 308'.

Alternately, the meter may be a pulse initiator-type meter wherein a pulse generator 350' is associated with the meter in place of an encoder 906. In the pulse initiator situation, electronic mechanical transducer 350' produces an electrical pulse after an incremental usage of electric power. These pulses are received by control means 904 regularly regardless of whether the remote module has been addressed by a communications terminal. The time of day, in particular the cost zone is monitored from a time of day clock 920. A multiplication factor is determined from the cost zone and the pulse or unity value is multiplied by the multiplication factor in means 922. The product of the multiplication is then stored in a memory 924 which stores the quantity of power usage measured, adjusted for the cost zone. Because each pulse represents a unity energy measurement value, multiplication means 922 need not actually multiply the unity pulse by the multiplication factor. Rather, the multiplication factor per se may be added to memory 924. The incoming command from the communications terminal causes control means 904 to retrieve the values stored in memory 924 and supply it to the address generator 908.

There are numerous alternate embodiments. For example, the address of the communications terminals or remote modules may be the frequency of the transmission rather than a three byte code. If various communications terminals and remote modules transmit on different frequencies, several communications can be transmitted simultaneously on the same power distribution lines without interference. Further, the present system may be used as simply a load control system or a meter reading system. The remote modules can be connected with natural gas, water and other utilities to read meters and perform load control functions. The load control portions of the remote modules may be located at areas of the power distribution lines other than at the customers' buildings. For example, load controls can be used to connect part of a secondary distribution feeder isolated by a line break or transformer failure with another secondary distribution feeder to correct a power outage.

The invention has been described with reference to preferred and alternate embodiments. This description is for the purpose of illustrating the invention only and not for the purpose of limiting same. Obviously, modifications and alterations will occur to others upon reading and understanding the specification. It is my intention to include all such modifications and alterations insofar as they come within the scope of the appended claims or the equivalents thereof.

What is claimed is:

1. A communications terminal comprising:
communication interface means for receiving and transmitting communications of a type including command communications which convey commands, individual power usage communications which convey usage data from each of a plurality of remote usage meters and cumulative usage communications for conveying usage data accumulated from at least part of the plurality of remote power usage meters;
identifying means for identifying a specific one of the remote usage meters associated with each of the individual usage communications, said identifying means being operatively connected with said communication interface means;
storing means for storing the usage data associated with each of the remote meters, said storing means being operatively connected with said communication interface means and said identifying means to obtain individual power usage data and identifications of remote meters;

command responding means for responding to a command conveyed in a command communication, said command responding means being operatively connected with said communication interface means, said comand responding means comprising means for retrieving cumulative usage data from said storing means in response to a cumulative usage retrieval command;

communication forming means for forming communications, said communication forming means being operatively connected with said usage retrieving means to receive cumulative usage data and being operatively connected with said communication interface means to supply formed communications to be transmitted, whereby the communication forming means forms and the communication means transmits cumulative power usage communications; and cost zone indicating means for indicating time of day cost zones, said cost zone indicating means being operatively connected with said storing means to provide an indication of the cost zone in which individual usage data is received, whereby the cumulative power usage communications indicate the amount of power measured by each remote meter in each cost zone.

2. The communications terminal as set forth in claim 1 wherein each individual communications includes a communications terminal address, a usage meter address, and usage data and wherein said identifying means comprises an address generator for generating an address in the storing means corresponding to each received usage meter address, whereby usage data is stored in said storing means at an address corresponding to the associated usage meter.

3. A communications terminal comprising:

communication interface means for receiving and transmitting communications of a type including command communications which convey commands, individual power usage communications which convey usage data from each of a plurality of remote usage meters and cumulative usage communications for conveying usage data accumulated from at least part of the plurality of remote power usage meters;

identifying means for identifying a specific one of the remote usage meters associated with each of the individual usage communications, said identifying means being operatively connected with said communication interface means;

storing means for storing the usage data associated with each of the remote meters, said storing means being operatively connected with said communication interface means and said identifying means to obtain individual power usage data and identifications of remote meters;

command responding means for responding to a command conveyed in a command communication, said command responding means being operatively connected with said communication interface means, said command responding means comprising means for retrieving cumulative usage data from said storing means in response to a cumulative usage retrieval command;

communication forming means for forming communications, said communication forming means being operatively connected with said usage retrieving means to receive cumulative usage data and being operatively connected with said communication interface means to supply formed communications to be transmitted, whereby the communication forming means forms and the communication means transmits cumulative power usage communications; and surge means for determining surges in usage, said surge means operatively connected with said communications interface means and said storing means to receive incoming individual usage data for determining usage surges and their magnitude, said surge means producing an indication of the magnitude of usage surges for storage in said storing means, whereby the usage communications indicate the amount of usage and the magnitude of at least one usage surge measured by each remote meter.

4. A communications terminal comprising:

communication interface means for receiving and transmitting communications of a type including command communications which convey commands, individual power usage communications which convey usage data from each of a plurality of remote usage meters, and cumulative usage communications which conveying usage data accumulated from at least part of the plurality of remote power usage meters, each communication including a communications terminal address;

identifying means for identifying a specific one of the remote usage meters associated with each of the individual usage communications, said identifying means being operatively connected with said communication interface means;

storing means for storing the usage data associated with each of the remote meters, said storing means being operatively connected with said communication interface means and said identifying means to obtain individual power usage data and identifications of remote meters;

command responding means for responding to a command conveyed in a command communication, said command responding means being operatively connected with said communication interface means, said command responding means comprising means for retrieving cumulative usage data from said storing means in response to a cumulative usage retrieval command;

communication forming means for forming communications, said communication forming means being operatively connected with said usage retrieving means to receive cumulative usage data and being operatively connected with said communication interface means to supply formed communications to be transmitted, whereby the communication forming means forms and the communication means transmits cumulative power usage communications;

communication destination determining means for determining whether each communication is directed to said communications terminal, said communication destination determining means being operatively connected with said communication interface means to receive communications therefrom and with said command responding means for enabling the command responding means in response to command signals directed to said communications terminal; and address altering means for altering the communications terminal address in a communication to address a specific, different communications terminal, said communication destination determining means being operatively connected with said address altering means for enabling the address altering means in response to command signals not directed to said communications terminal, said address altering means operatively connected with said communication interface means and said communication forming means, whereby said communications terminal receives, readdresses and retransmits communications directed to another communications terminal.

5. The communications terminal as set forth in claim 4 further comprising acknowledgment means for producing an acknowledgment, said acknowledgment means operatively connected with said communication forming means for forming an acknowledgment communication, said acknowledgment means operatively connected with said communication destination determining means to be enabled thereby in response to a command directed to said communications terminal, whereby the communications terminal transmits an acknowledgment upon receiving a command directed thereto.

6. The communications terminal as set forth in claim 5 further comprising transmission timing means for timing the duration between transmission of a readdressed command communication and receipt of an acknowledgment communication, said transmission timing means being operatively connected with said address altering means to initiate timing in response to readdressing a command communication and to terminate timing in response to readdressing an acknowledgment communication; and an error signalling means for signalling an error in response to said transmission timing means timing in excess of a selectable time period, said error signalling means being operatively connected with said communication timing means and said communication forming means whereby the communications terminal produces an error signal unless an acknowledgment signal is received from a destination communications terminal within the selectable time period.

7. The communications terminal as set forth in claim 4 wherein said communication interface comprises coupler means for coupling the communications terminal with A/C electric power lines, said coupler means separating the communications from the A/C electric power.

8. The communications terminal as set forth in claim 4 further comprising error checking means for checking received communications for freedom from errors and distortion introduced during transmissions, said error checking means operatively connected with said communications interface means.

9. The communications terminal as set forth in claim 8 further comprising counting means for counting the number of communications received without error which are addressed to said communications terminal, said counting means being operatively connected with said error checking means and said means for determining whether a communication is addressed to said communications terminal.

10. The communications terminal as set forth in claim 9 wherein said counting means further counts the number of communications received which are addressed to preselected other communications terminals.

11. The communications terminal as set forth in claim 10 wherein said command responding means further comprises count retrieving means for retrieving the numbers of communications counted by said counting means in response to a count retrieval command, said count retrieving means being operatively connected with said counting means and said communication forming means, whereby the communications terminal responds to a count retrieval command communication by transmitting a number of counted communications.

12. A communications terminal comprising:

communication interface means for receiving and transmitting communications of a type including command communications which convey commands, individual power usage communications which convey usage data from each of a plurality of remote usage meters and cumulative usage communications for conveying usage data accumulated from at least part of the plurality of remote power usage meters, said communication interface means comprising communication circuitry means for converting communications between phase modulated communications and digital communications, said phase modulated communications having a selectable carrier frequency and a selectable data transmission rate;

identifying means for identifying a specific one of the remote usage meters associated with each of the individual usage communications, said identifying means being operatively connected with said communication interface means;

storing means for storing the usage data associated with each of the remote meters, said storing means being operatively connected with said communication interface means and said identifying means to obtain individual power usage data and identifications of remote meters;

command respond means for responding to a command conveyed in a command communication, said command responding means being operatively connected with said communication interface means, said command responding means comprising means for retrieving cumulative usage data from said storing means in response to a cumulative usage retrieval command;

communication forming means for forming communications, said communication forming means being operatively connected with said usage retrieving means to receive cumulative usage data and being operatively connected with said communication interface means to supply formed communications to be transmitted, whereby the communication forming means forms and the communication means transmits cumulative power usage communications:

13. The communications terminal as set forth in claim 12 wherein said command responding means further comprises a load control means for generating individual load control communications in response to a load control command, said individual load control communications being addressed to a plurality of remote load control modules for causing each of the plurality of remote load control modules to perform a commanded load control function.

14. The communications terminal as set forth in claim 12 wherein said identifying means comprises means for serially addressing each one of the plurality of usage meters to cause individual usage data to be conveyed from each addressed usage meter to the communication receiving means, whereby the storing means receives each usage meter address to identify the usage meter with which the next received usage data is associated.

15. The communications terminal as set forth in claim 12 wherein said communications circuitry comprises a receiver for receiving phase modulated communications of the selectable carrier frequency, a demodulator means for demodulating phase modulated communications received by said receiver, said demodulator means being operatively connected with said receiver, decoder means for decoding the phase modulated communications received by said receiver to produce the digital communications, said decoding means being operatively connected with said receiver and said demodulating means, and transmitter means for receiving digital communications and transmitting corresponding phase modulated communications on the selectable carrier frequency.

16. The communications terminal as set forth in claim 15 wherein said communications circuitry further comprises means for selecting the selectable carrier frequency from a plurality of predetermined carrier frequency, said carrier frequency selecting means being operatively connected with said receiver for selecting the selectable carrier frequency to be received and being operatively connected with said transmitter means for selecting the selectable carrier frequency for the transmitted communication.

17. The communications terminal as set forth in claim 16 wherein said communications circuitry further comprises means for selecting the selectable data transmission rate, said data transmission rate selecting means being operatively connected to said decoder means and with said transmitter means.

18. The communications terminal as set forth in claim 15 wherein said transmitter means comprises an amplifier means for amplifying the phase modulated communications, the amplifier means having an output, means for causing the amplifier means to increase the current at the output generally inversely with the voltage at the output whereby the transmitter means transmits the phase modulator communication with generally constant power.

19. The communications terminal set forth in claim 18 wherein said receiver is a double conversion superheterodyne receiver and said transmitter means is a double conversion transmitter.

20. A data communication system for transmitting data communications on electric distribution lines comprising:

a central control unit;

a plurality of communications terminals including at least a first communications terminal operatively connected to said central unit with a data communication link, said plurality of communications terminals being operatively connected with said electric power distribution lines for transmitting and receiving communications on the electric power distribution lines;

a plurality of remote modules, said plurality of remote modules being operatively connected with said electric power distribution lines for transmitting and receiving communications to and from said communications terminals;

said central control unit comprising communication forming means for forming a communication; the communication comprising the address of a destination communications terminal, the address of intermediate communications terminals, and a command, said destination communications terminal being at least one of the plurality of communications terminals to which the command is directed and said intermediate communications terminals being communications terminals disposed along the electric power distribution lines along a route between the central control unit and the destination communications terminal;

communications terminal addressing means for generating the addresses of said destination communications terminal and said intermediate communications terminals, said communications terminal address generating means being operatively connected with said communication forming means; command generating means for generating the command, said command generating means being operatively connected with said communication forming means; interface means for transmitting and receiving communications with said first communications terminal, said interface means operatively connected with said communications forming means; timing means for timing the duration between transmitting a communication containing a command and receiving a communication containing an indication that the command was received by the destination communications terminal, said timing means operatively connected with said interface means; rerouting means for altering the intermediate communications terminals addressed along the route between the central control unit and said destination communications terminal, said rerouting means being operatively connected with said timing means, said timing means permitting said rerouting means to alter the intermediate communications terminals addressed in response to the duration since transmitting the communication exceeding a selected duration, whereby the central unit reroutes a communication through different intermediate communications terminals when an indication is not timely received from the destination communications terminal;

each of said communications terminal means comprising communications interface means for receiving and transmitting communications; communications terminal address determining means for determining whether a communication received from the electric power distribution lines is addressed to the receiving communications terminal, said communications terminal address determining means being operatively connected with said communications interface means; communication destination determining means for determining whether the communication received from the electric power distribution lines is directed to the receiving communications terminal; command reponding means for responding to a command conveyed in a received command communication, said command responding means being controlled by said communication destination determining means to respond to the command directed to the receiving communications terminal, said command responding means comprising producing an indication that the command was received, said command responding means being operatively connected with said communication interface and said communication destination determining means;

address altering means for readdressing the received communication to another of the intermediate communications terminals, said address altering means controlled by said communication destination determining means to readdress communications not directed to the receiving communications terminal, said address altering means operatively connected with said communication interface means, and said communication destination determining means; and communications forming means for forming communications for transmission by said communications interface means, said communications forming means being operatively connected with said communications interface means, with said address altering means, and with said command responding means; whereby said receiving communications terminal readdresses and retransmits communications directed to another communications terminal and transmits an indication that a communication directed to itself was received.

21. The communication system as set forth in claim 20 wherein the command responding means of each of the communications terminals comprises acknowledgement means for producing an acknowledgement in response to commands directed to the receiving communications terminal, whereby the indication that a command was received is an acknowledgement.

22. The communication system as set forth in claim 21 wherein each of said communications terminals further comprises identifying means for identifying a specific one of the plurality of remote modules associated with an individual usage communication received by the communication interface means from a remote module, said identifying means being operatively connected with said communications interface means; storing means for storing usage data conveyed in the individual usage communications, said storing means being operatively connected with said communications interface means and said identifying means; and, wherein said command responding means comprises means for retrieving usage data accumulated in said storing means in response to receiving a comulative usage retrieval command, said usage retreiving means being operatively connected with said storing means and with said communications forming means whereby in response to a cumulative power usage retrieval command directed to the receiving communications terminal, one or more communaications conveying the accumulated usage data from a plurality of remote modes is formed and transmitted.

23. The communications system as set forth in claim 22 wherein each of said plurality of remote modules comprises
a usage meter for metering the amount of power conveyed through the meter, said usage meter operatively connected with said electric power distribution lines;
electrical signal means for producing electrical signals indicative of the amount metered by the usage meter, said electric signals comprising individuals remote module usage data, said electric signal means being operatively connected with said usage meter; communications terminal address means for generating the address of one of said plurality of communications terminals that is associated with the remote module;
communication forming means for forming a communication, said communication forming means operatively connected with said communications terminal address means and said electric signal means to form communications comprising the address of an associated communications terminal and the usage data; and
communications interface means for transmitting said communications on said electric power distribution lines, said communications interface means being operatively connected with said communications interface forming means.

24. The communications system as set forth in claim 23 wherein said electric signal means of each of said remote modules comprises a pulse generator for generating an electrical pulse after the usage meter meters a predetermined incremental amount of power; and wherein said remote module further comprises a remote module address means for generating the address of the remote module, said remote module address means being operatively connected with said communications forming means whereby each communication transmitted by the remote module comprises a communications terminal address, the remote module address, and usage data indicating the usage of the predetermined incremental amount of power.

25. The communications system as set forth in claim 24 wherein said identifying means of each of the communications terminals comprises a storing means address generator for generating an address in the storing means corresponding to each received remote module address whereby the incremental usage data is stored at an address corresponding to the associated remote module.

26. The communications system as set forth in claim 23 wherein the remote module communications interface means of each remote module further receives communications addressed to the remote module; wherein the electric signal means of each remote module is an encoder for producing electrical signals indicative of the total power usage since the meter was initialized; and wherein each remote module further comprises remote module command responding means for responding to commands addressed to the remote module, said remote module command responding means comprises means for actuating said encoder whereby said remote module generates a communication comprising the communications terminal address and power usage data indicative of power used since the meter was initialized.

27. The communications system as set forth in claim 26 wherein said identifying means in each of said communications terminals comprises means for serially addressing each of a subset of the plurality of remote modules associated with said communications terminal with a command signal to actuate the encoder and an address generator for generating a storing means address in response to each serial remote module address, whereby the storing means stores received power usage data at addresses corresponding to the immediately precedingly transmitted remote module address.

28. The communications system as set forth in claim 23 wherein each of said communications terminals further comprises means for indicating time of day cost zones, said cost zone indicating means being operatively connected with said storing means to provide an indication of the cost zone in which individual usage data is received, whereby the cumulative usage communications indicate the amount of power measured by each remote meter in each cost zone.

29. The communications system as set forth in claim 23 wherein each of said communications terminals further comprise means for determining surges in usage, said surge means operatively connected with said communications interface means and said storing means to receive incoming individual usage data for determining power usage surges and their magnitude, said surge means producing an indication of the magnitude of usage surges for storage in said storing means, whereby the usage communications indicate the amount of usage and the magnitude of at least one usage surge measured by each remote meter.

30. The communications system as set forth in claim 23 wherein each of said communications terminals further comprises transmission timing means for timing the duration between transmission of a readdressed command communication and receipt of an acknowledgment or usage data communication, said transmission timing means being operatively connected with said address altering means to initiate timing in response to readdressing a command communication and to terminate timing in response to readdressing the acknowledgment or usage data communication; and an error signalling means for signalling an error in response to said transmission timing means timing in excess of a selectable time period, said error signalling means being operatively connected with said communication timing means and said communication forming means whereby the communications terminal produces an error signal unless an acknowledgment signal is received from a destination communications terminal within the selectable time period.

31. The communications system as set forth in claim 23 wherein the remote module interface means of each of the remote modules further receives communications addressed to the remote module; and wherein each of the remote modules further comprises remote module command responding means for responding to comands in communications addressed to the remote module, said remote module command responding means comprising remote module load control command recognizing means for disconnecting a load indicated by the remote module load control command from the electric power distribution lines, said remote module command responding means being operatively connected with said remote module communications interface means.

32. The communications system as set forth in claim 31 wherein said command responding means of each of said communications terminals further comprises communications terminal load control command responding means for generating remote module load control commands and addresses for a plurality of remote modules, the communications terminal load control command responding means being operatively connected to the communication forming means whereby the communications terminal transmits at least one remote module load control communication comprising at least one remote module address and at least one remote module load control command.

33. The communications system as set forth in claim 23 wherein each of said communications terminals further comprises error checking means for checking received communications for freedom from errors and distortion introduced during transmissions, said error checking means operatively connected with said communications interface means.

34. The communications system as set forth in claim 33 wherein each of said communications terminals further comprises counting means for counting the number of communications addressed to the receiving communications terminal which are received without error and for counting the number of communications addressed to predetermined communications terminals other than the receiving communications terminal which are received without error, said counting means being operatively connected with said error checking means and said means for determining whether a communication is addressed to the receiving communications terminal.

35. The communications system as set forth in claim 32 wherein said command responding means of each of the communications terminals further comprises count retrieving means for retrieving the numbers of communications counted by said counting means in response to a count retrieval command, said count retrieving means being operatively connected with said counting means and said communication forming means, whereby the communications terminal responds to a count retrieval command communication by transmitting a number of counted communications.

36. The communications system as set forth in claim 35 wherein said central control unit further comprises means for comparing the number of communications counted with an indication of the number of communications set, said comparing means being operatively connected with the interface means for receiving at least number counted data from received communications and with said rerouting means, whereby when a communications terminal counts as received without error substantially all communications addressed to a preceding communications terminal along a route, the rerouting means can reroute communications to skip the preceding communications terminal.

37. The communications system as set forth in claim 23 wherein said central control unit further comprises memory means for storing usage data, associated with each of the plurality of remote modules, said memory means being operatively connected with said interface means to receive at least the cumulative usage data from said plurality of communications terminals.

38. The communications system as set forth in claim 37 wherein said central control unit further comprises clock means for periodically causing said communications terminal addressing means and said command generating to address each of the plurality of communications terminals with a command to transmit usage data to the central control unit, said clock means being operatively connected with said communications terminal addressing means, whereby the memory means is periodically updated with the usage data metered by substantially all of the remote modules.

39. The communications system as set forth in claim 20 wherein said communications interface means of each of the communications terminal comprises means for selecting the rate of data transmission for at least transmitted communications, and wherein said command responding means of each of the communications terminals comprises means for responding to a data transmission rate selection command to select the data transmission rate of transmitted communications, said data transmission rate selection command responding means being operatively connected with said data transmission rate selecting means, whereby the communications terminal can be commanded to alter the rate of data transmission.

40. The communications system as set forth in claim 20 wherein said communications interface means of each communications terminal comprises means for selecting a carrier frequency for received and transmitted communications and wherein said command responding means of each communications terminal comprises frequency selection command responding means for responding to a frequency selection command to select the carrier frequency of transmitted and received communications, said frequency selection command responding means being operatively connected with said carrier frequency selecting means, whereby the communications terminal can be commanded to transmit and receive communications on a selectable carrier frequency.

41. The communications system as set forth in claim 40 wherein said communications interface of each communications terminal further comprises a coupling means operatively connected with the electric power distribution lines, a receiver for receiving communications from the electric power distribution lines, said receiver operatively connected with the coupling means and with the frequency selecting means, decoding means for decoding communications received by the receiver, said decoding means being operatively connected to the receiver and said communications terminal address determining means, and transmitter means for transmitting communications, said transmitter means being operatively connected with said communications forming means, said frequency selecting means, and said coupling means.

42. The communications system as set forth in claim 41 wherein said transmitter means comprises an adjustable gain amplifier means for amplifying communications, impedance determining means for determining the impedance of the electric power lines, and gain adjusting means for adjusting the gain of the amplifier means generally with the impedance of the electric power lines whereby the gain of the amplifier means is increased as the impedance of the electric power lines increases and is decreased as the impedance of the power lines decreases.

43. The communications system as set forth in claim 20 wherein said electric distribution lines comprise at least one primary distribution feeder and at least one secondary distribution feeder, said secondary distribution feeder being operatively connected to said primary distribution feeder by a distribution transformer and wherein the communication system comprises bypass means for conveying communications around the distribution transformers, said bypass means comprising a first coupling means for passing communications but not electric power, the first coupling means operatively connected to said primary distribution feeder, a second coupling means for passing communication but not electric power, said second coupling means being operatively connected to said secondary distribution feeder, down link amplifier means for amplifying communications received from the first coupling means, said down link amplifier means being operatively connected with the first and second coupling means, impedance matching means for first varying the gain of the down link amplifier means with variations in the impedance of the secondary distribution feeder, up link amplifier means for amplifying communications received from the second coupling, said up link amplifying means being operatively connected with the first and second coupling means, and second impedance matching means for varying the gain of the up link amplifier means with variations in the impedance of the primary distribution feeder.

* * * * *